(12) United States Patent
Lee et al.

(10) Patent No.: US 10,955,951 B2
(45) Date of Patent: Mar. 23, 2021

(54) TOUCH DISPLAY DEVICE, COMMON DRIVING CIRCUIT, AND DRIVING METHOD

(71) Applicant: LG DISPLAY CO., LTD., Seoul (KR)

(72) Inventors: HongJu Lee, Seoul (KR); HyeongWon Kang, Seoul (KR); Youngwoo Jo, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/719,006

(22) Filed: Dec. 18, 2019

(65) Prior Publication Data
US 2020/0210007 A1    Jul. 2, 2020

(30) Foreign Application Priority Data
Dec. 27, 2018 (KR) .................. 10-2018-0171170

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G02F 1/136286* (2013.01);
(Continued)

(58) Field of Classification Search
CPC ...... G06F 3/0412; G06F 3/0416; G06F 3/044; G06F 3/0443; G06F 3/047;
(Continued)

(56) References Cited

U.S. PATENT DOCUMENTS 9,927,904 B2    3/2018 Lee
10,067,601 B2    9/2018 Kurasawa et al.
(Continued)

FOREIGN PATENT DOCUMENTS

CN    104090698 A    10/2014
JP    2018-5882 A    1/2016
(Continued)

*Primary Examiner* — Xuemei Zheng
(74) *Attorney, Agent, or Firm* — Birch, Stewart, Kolasch & Birch, LLP

(57) ABSTRACT

A touch display device, a common driving circuit, and a driving method are discussed. The touch display device can include a common driving circuit configured to drive a plurality of common electrodes used for display driving and touch driving, wherein the common driving circuit can include a common signal stabilization amplifier configured to control the average of a first input signal and a second input signal, which are respectively received from a first common electrode and a second common electrode, to correspond to a reference common signal and to output a first control input signal and a second control input signal; and a differential amplifier configured to output a differential sensing signal that is proportional to the difference between the first control input signal and the second control input signal. Accordingly, the impact of display driving and touch driving on each other when simultaneously performing the display driving and the touch driving can be reduced.

22 Claims, 20 Drawing Sheets

(51) Int. Cl.
    *G09G 3/36* (2006.01)
    *G06F 3/047* (2006.01)
    *G02F 1/1333* (2006.01)
    *G02F 1/1362* (2006.01)

(52) U.S. Cl.
    CPC ........... *G06F 3/047* (2013.01); *G09G 3/3677* (2013.01); *G09G 3/3688* (2013.01); *G02F 2001/13629* (2013.01); *G02F 2201/121* (2013.01)

(58) Field of Classification Search
    CPC ............ G06F 3/0418–04184; G02F 2201/121; G09G 3/3677; G09G 3/3688
    See application file for complete search history.

(56) References Cited

U.S. PATENT DOCUMENTS

| | | |
|---|---|---|
| 2011/0241753 A1 | 10/2011 | Sakamoto et al. |
| 2015/0212643 A1 | 7/2015 | Lee et al. |
| 2015/0277655 A1* | 10/2015 | Kim ..................... G06F 3/0416 345/174 |
| 2017/0108990 A1 | 4/2017 | Min et al. |
| 2018/0004343 A1 | 1/2018 | Shin |
| 2020/0103993 A1* | 4/2020 | Krah ..................... G06F 3/0443 |

FOREIGN PATENT DOCUMENTS

| | | |
|---|---|---|
| JP | 2017-162255 A | 9/2017 |
| TW | 201243689 A1 | 11/2012 |
| WO | WO 20151059995 A1 | 4/2015 |

* cited by examiner

TOUCH DISPLAY DEVICE, COMMON DRIVING CIRCUIT, AND DRIVING METHOD

CROSS REFERENCE TO RELATED APPLICATION

This application claims priority to Korean Patent Application No. 10-2018-0171170, filed in the Republic of Korea on Dec. 27, 2018, which is hereby incorporated by reference for all purposes as if fully set forth herein into the present application.

BACKGROUND OF THE INVENTION

1. Field of the Invention

Embodiments of the disclosure relate to a touch display device, a common driving circuit, and a driving method.

2. Description of the Background Art

With the development of the information-oriented society, there is a growing demand for display devices in various forms for displaying images.

Among these display devices, a touch display device is capable of providing a touch-based input mode that enables a user to easily, intuitively, and conveniently input information or commands, representing a departure from conventional input modes using buttons, a keyboard, and a mouse.

Since the touch display device needs to provide both an image display function and a touch-sensing function, it is necessary to divide a driving time, such as a frame time, into a display driving period and a touch driving period, to perform display driving in the display driving period, and to perform touch driving and touch sensing in the touch driving period which follows the display driving period.

In the foregoing time-division driving method, highly precise timing control can be required and expensive components therefor can be needed to perform the display driving and touch driving in a time-division manner within a designated time.

Also, in the time-division driving method, both the display driving time and touch driving time can be insufficient, thus causing deterioration in both image quality and touch sensitivity. Particularly, due to the application of the touch-sensing function, it is difficult to provide a high-resolution image quality.

SUMMARY OF THE INVENTION

An aspect of embodiments of the disclosure is to provide a touch display device, a con non driving circuit, and a driving method that enable display driving and touch driving to be simultaneously performed.

Another aspect of embodiments of the disclosure is to provide a touch display device, a common driving circuit, and a driving method that make it possible to reduce the impact of display driving and touch driving on each other when simultaneously performing the display driving and touch driving.

Still another aspect of embodiments of the disclosure is to provide a touch display device, a common driving circuit, and a driving method that can prevent an unstable phenomenon that a signal necessary for both the display driving and touch driving swings when simultaneously performing the display driving and touch driving, thereby improving image quality even though simultaneously performing the display driving and touch driving.

In accordance with an aspect of embodiments of the disclosure, a touch display device can include a display panel on which a plurality of data lines and a plurality of gate lines are disposed and on which a plurality of common electrodes is disposed; a data driving circuit configured to drive the plurality of data lines; a gate driving circuit configured to drive the plurality of gate lines; and a common driving circuit configured to differentially sense a first common electrode and a second common electrode among the plurality of common electrodes and to output a differential sensing signal.

The common driving circuit can include a common signal stabilization amplifier configured to control an average of a first input signal and a second input signal, which are respectively received from the first common electrode and the second common electrode, to correspond to a reference con non signal and to output a first control input signal and a second control input signal; and a differential amplifier configured to output the differential sensing signal that is proportional to the difference between the first control input signal and the second control input signal.

The first control input signal can be different from the first input signal, and the second control input signal can be different from the second input signal.

The first control input signal can be a signal in which noise charges are canceled in the first input signal, and the second control input signal can be a signal in which the noise charges are canceled in the second input signal.

The common signal stabilization amplifier can include an input circuit configured to compare the average of the first input signal and the second input signal, which are input from the first common electrode and the second common electrode through a first input terminal and a second input terminal, with the reference common signal input through a reference input terminal; a control circuit configured to control the first input signal and the second input signal so that the average of the first input signal and the second input signal corresponds to the reference common signal; and an output circuit configured to output the first control input signal corresponding to the first input signal controlled by the control circuit and the second control input signal corresponding to the second input signal controlled by the control circuit through a first output terminal and a second output terminal.

The first output terminal can be electrically connected to the first input terminal through a first feedback line, and the second output terminal can be electrically connected to the second input terminal through a second feedback line.

According to one example of the internal configuration of the common signal stabilization amplifier, the input circuit can include a first input circuit including N-type transistors and a second input circuit including P-type transistors.

The control circuit can include a first control circuit including P-type transistors and a second control circuit including N-type transistors.

The output circuit can include a first output circuit including a P-type transistor and an N-type transistor and a second output circuit including a P-type transistor and an N-type transistor.

The first input circuit can include first to third N-type transistors having gate nodes to which the reference common signal, the first input signal, and the second input signal are respectively applied and a fourth N-type transistor that is electrically connected to a point, to which source nodes of the first to third N-type transistors are commonly connected, and to a low-potential voltage node.

The second input circuit can include first to third P-type transistors having gate nodes to which the reference common signal, the first input signal, and the second input signal are respectively applied and a fourth P-type transistor that is electrically connected to a point, to which source nodes of the first to third P-type transistors are commonly connected, and to a high-potential voltage node.

The second and third N-type transistors can be connected in parallel, and the second and third P-type transistors can be connected in parallel.

According to another example of the internal configuration of the common signal stabilization amplifier, the input circuit can include a first input circuit including N-type transistors and a second input circuit including P-type transistors.

The control circuit can include a first control circuit including P-type transistors and a second control circuit including N-type transistors.

The output circuit can include a first output circuit including a P-type transistor and an N-type transistor and a second output circuit including a P-type transistor and an N-type transistor.

The first input circuit can include a first part including first and second N-type transistors having gate nodes to which the reference common signal and the first input signal are respectively applied and a third N-type transistor that is electrically connected to a point, to which source nodes of the first and second N-type transistors are commonly connected, and to a low-potential voltage node.

The first input circuit can include a second part including fourth and fifth N-type transistors having gate nodes to which the reference common signal and the second input signal are respectively applied and a sixth N-type transistor that is electrically connected to a point, to which source nodes of the fourth and fifth N-type transistors are commonly connected, and to the low-potential voltage node.

The second input circuit can include a first part including first and second P-type transistors having gate nodes to which the reference common signal and the first input signal are respectively applied and a third P-type transistor that is electrically connected to a point, to which source nodes of the first and second P-type transistors are commonly connected, and to a high-potential voltage node.

The second input circuit can include a second part including fourth and fifth P-type transistors having gate nodes to which the reference common signal and the second input signal are respectively applied and a sixth P-type transistor that is electrically connected to a point, to which source nodes of the fourth and fifth P-type transistors are commonly connected, and to the high-potential voltage node.

Drain nodes of the first and fourth N-type transistors can be electrically connected to each other, and drain nodes of the second and fifth N-type transistors can be electrically connected to each other.

Drain nodes of the first and fourth P-type transistors can be electrically connected to each other, and drain nodes of the second and fifth P-type transistors can be electrically connected to each other.

According to still another example of the internal configuration of the common signal stabilization amplifier, the input circuit can include an average circuit configured to receive the first input signal and the second input signal and to output the average thereof, a first input circuit including N-type transistors, and a second input circuit including P-type transistors.

The control circuit can include a first control circuit including P-type transistors and a second control circuit including N-type transistors.

The output circuit can include a first output circuit including a P-type transistor and an N-type transistor and a second output circuit includes a P-type transistor and an N-type transistor.

The first input circuit can include first and second N-type transistors having gate nodes to which the reference common signal and the average are respectively applied and a third N-type transistor that is electrically connected to a point, to which source nodes of the first and second N-type transistors are commonly connected, and to a low-potential voltage node.

The second input circuit can include first and second P-type transistors having gate nodes to which the reference common signal and the average are respectively applied and a third P-type transistor that is electrically connected to a point, to which source nodes of the first and second P-type transistors are commonly connected, and to a high-potential voltage node.

In the examples of the internal configuration of the common signal stabilization amplifier, the P-type transistor and the N-type transistor in the first output circuit can be turned on or off respectively by a signal output from the first control circuit and a signal output from the second control circuit and can be connected in series between a high-potential voltage node and a low-potential voltage node, and the first control input signal can be output from a connection node connecting the P-type transistor and the N-type transistor in the first output circuit.

Further, the P-type transistor and the N-type transistor in the second output circuit can be turned on or off respectively by the signal output from the first control circuit and the signal output from the second control circuit and can be connected in series between the high-potential voltage node and the low-potential voltage node, and the second control input signal can be output from a connection node connecting the P-type transistor and the N-type transistor in the second output circuit.

The common signal stabilization amplifier can supply the reference common signal, which is input through the reference input terminal, to the first common electrode and the second common electrode through the first input terminal and the second input terminal.

The differential sensing signal output from the differential amplifier can include a first output signal and a second output signal having a difference proportional to the difference between the first control input signal and the second control input signal.

The plurality of common electrodes can be arranged in a matrix form, and each of the plurality of common electrodes can overlap two or more sub-pixels.

The first common electrode and the second common electrode among the plurality of common electrodes can be disposed in the same column or the same row, two or more data lines overlapping the first common electrode can overlap the second common electrode, and two or more gate lines overlapping the first common electrode cannot overlap the second common electrode.

A plurality of common lines electrically connecting the plurality of common electrodes and the common driving circuit can be disposed on the display panel, and the plurality of common lines can be disposed in parallel with the plurality of data lines.

The plurality of common lines can include a first common line configured to electrically connect the first common electrode and the common driving circuit, and a second common line configured to electrically connect the second common electrode and the common driving circuit.

The first common line can overlap the second common electrode but can be insulated from the second common electrode on the display panel.

The common driving circuit can differentially sense the first common electrode and the second common electrode while display driving is performed by supplying a data signal for image display to the plurality of data lines.

The reference common signal can be a signal having a variable voltage level.

For example, the width of a high-level voltage period of the reference common signal can be longer than one horizontal time for display driving.

In another example, the width of a high-level voltage period of the reference common signal can be shorter than one horizontal time for display driving.

The data driving circuit can convert digital image data into an analog image signal on the basis of a gamma reference voltage, and the gamma reference voltage can correspond in frequency and phase to the reference common signal.

A ground voltage applied to the display panel can be a signal having a variable voltage level and can correspond in frequency and phase to the reference common signal.

In accordance with another aspect of embodiments of the disclosure, a touch display device can include a display panel on which a plurality of data lines and a plurality of gate lines are disposed and on which a plurality of common electrodes is disposed; a data driving circuit configured to drive the plurality of data lines; a gate driving circuit configured to drive the plurality of gate lines; and a common driving circuit configured to differentially amplify a first input signal and a second input signal received from a first common electrode and a second common electrode among the plurality of common electrodes.

The common driving circuit can remove noise from the first input signal and the second input signal and can then differentially amplify the first input signal and the second input signal.

In accordance with still another aspect of embodiments of the disclosure, a common driving circuit can include a common signal stabilization amplifier configured to control an average of a first input signal and a second input signal, which are respectively received from a first common electrode and a second common electrode among a plurality of common electrodes disposed on a display panel, to correspond to a reference common signal and to output a first control input signal and a second control input signal; and a differential amplifier configured to output a differential sensing signal that is proportional to the difference between the first control input signal and the second control input signal.

In accordance with yet another aspect of embodiments of the disclosure, a method of driving a touch display device can include outputting a data signal and a gate signal to a data line and a gate line disposed on a display panel and outputting a reference common signal to two or more of a plurality of common electrodes disposed on the display panel; and displaying an image in response to the data signal and the reference common signal and sensing a touch by differential sensing after removing noise from a first input signal and a second input signal received from the two or more common electrodes, to which the reference common signal is applied.

According to embodiments of the disclosure, it is possible to provide a touch display device, a common driving circuit, and a driving method that enable display driving and touch driving to be simultaneously performed.

Further, according to embodiments of the disclosure, it is possible to provide a touch display device, a common driving circuit, and a driving method that can reduce the impact of display driving and touch driving on each other when simultaneously performing display driving and touch driving.

In addition, according to embodiments of the disclosure, it is possible to provide a touch display device, a common driving circuit, and a driving method that can prevent an unstable phenomenon that a signal necessary for both display driving and touch driving swings when simultaneously performing display driving and touch driving, thereby improving image quality even though simultaneously performing display driving and touch driving.

BRIEF DESCRIPTION OF THE DRAWINGS

The above and other aspects, features and advantages of the disclosure will be more apparent from the following detailed description taken in conjunction with the accompanying drawings, in which.

DETAILED DESCRIPTION OF THE EXEMPLARY EMBODIMENTS

Figure 1:
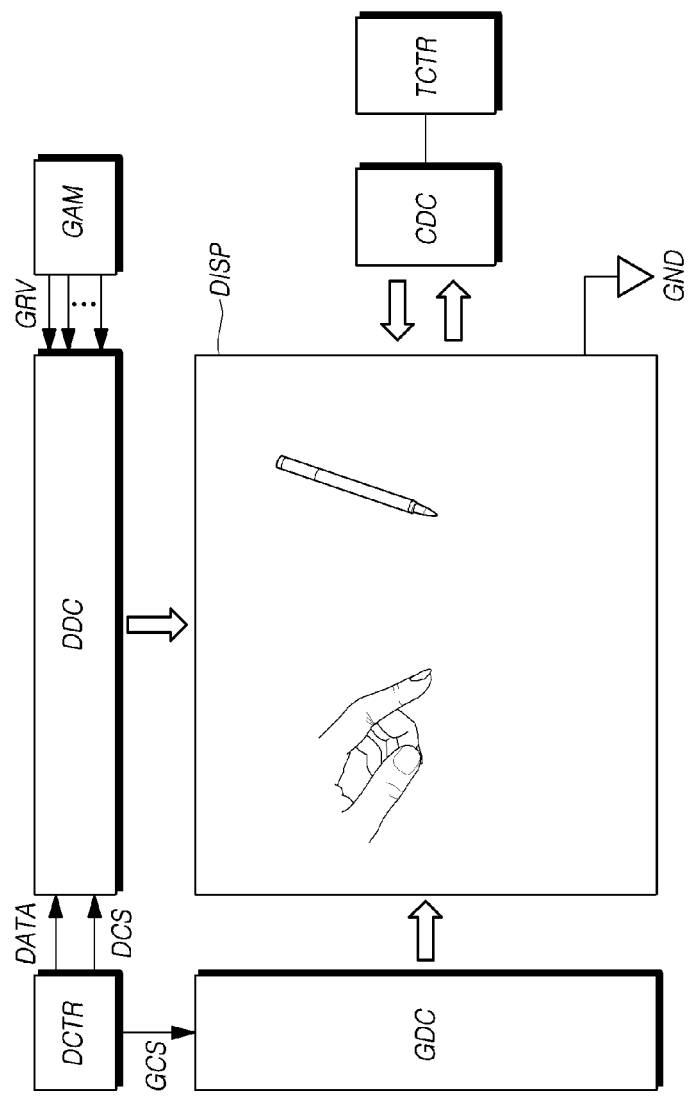
FIG. 1 illustrates the configuration of a touch display device according to embodiments of the disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Figure 2:
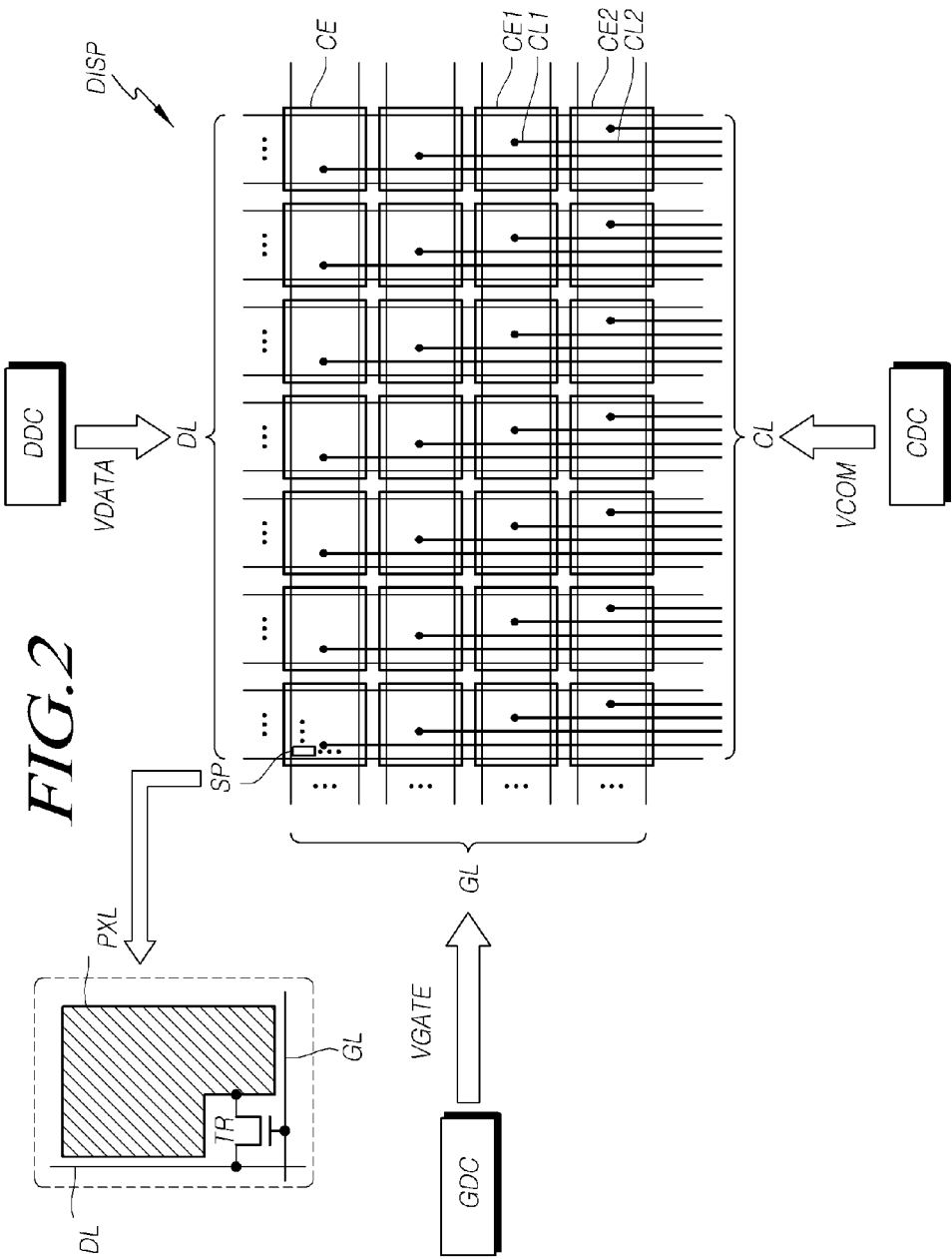
FIG. 2 illustrates a display panel and driving circuits according to embodiments of the disclosure.
Figure 3:
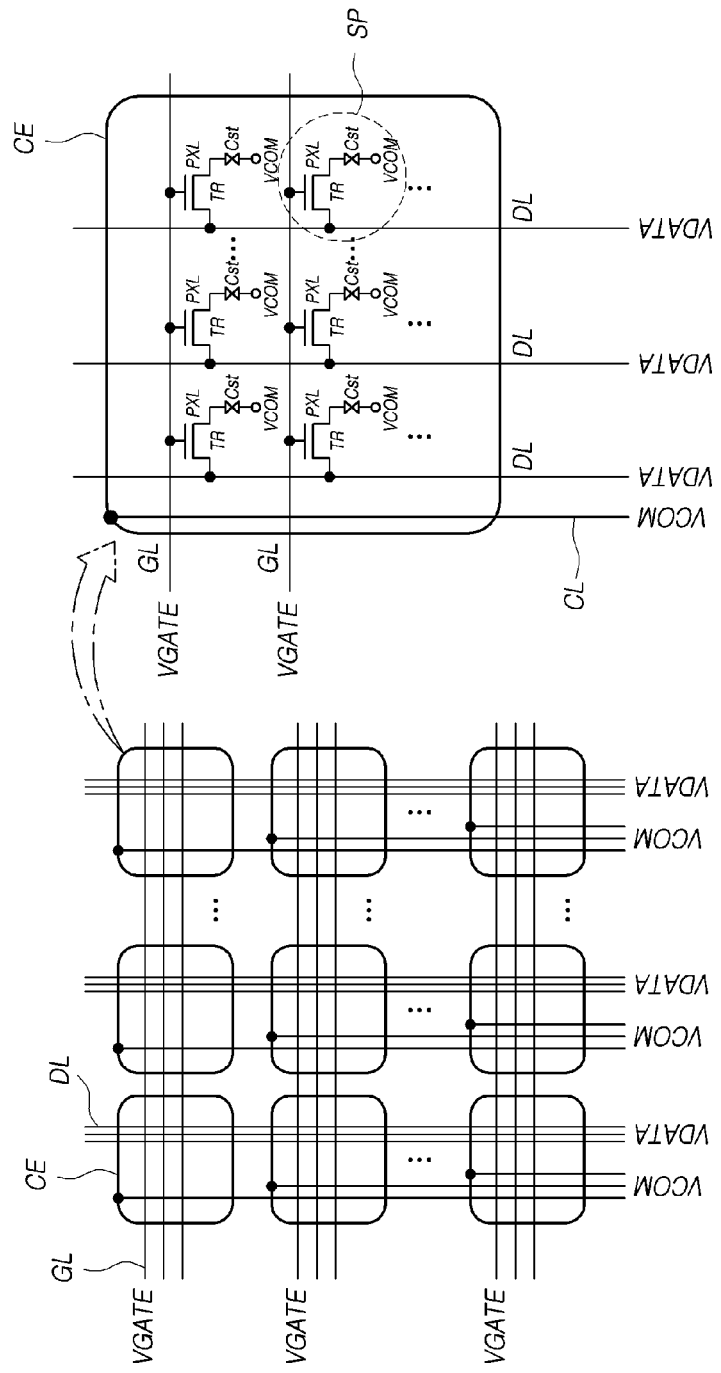
FIG. 3 illustrates a structure in which sub-pixels are arranged in one common electrode area on a display panel according to embodiments of the disclosure.

FIG. 1 illustrates the configuration of a touch display device according to embodiments of the disclosure, FIG. 2 illustrates a display panel DISP and driving circuits according to embodiments of the disclosure, and FIG. 3 illustrates a structure in which sub-pixels SP are arranged in one common electrode CE area on the display panel DISP according to embodiments of the disclosure. All the components of the touch display device according to all embodiments of the disclosure are operatively coupled and configured.

Referring to FIG. 1, the touch display device according to embodiments of the disclosure can provide a display function of displaying an image. Further, the touch display device according to embodiments of the disclosure can provide a touch-sensing function of sensing a touch by a user and a touch input function of processing input due to a touch by a user on the basis of the touch-sensing result.

Referring to FIG. 1 to FIG. 3, in order to provide the display function, the touch display device according to embodiments of the disclosure can include the display panel DISP on which a plurality of data lines DL and a plurality of gate lines GL can be disposed and on which a plurality of sub-pixels SP defined by the plurality of data lines DL and the plurality of gate lines GL is arranged; and driving circuits to drive the display panel DISP.

Further, in addition to the plurality of data lines DL disposed in a row direction (or a column direction) and the plurality of gate lines GL disposed in the column direction (or the row direction), a plurality of common electrodes CE to which a common signal VCOM is applied and a plurality of common lines CL electrically connected to the plurality of common electrodes CE can be disposed for display driving on the display panel DISP.

For example, the plurality of common electrodes CE can be arranged in a matrix form.

Each of the plurality of common electrodes CE can be in various forms. For example, one common electrode CE can be a plate-shaped electrode having no opening, can be a mesh-shaped electrode having openings, or can be an electrode having a plurality of bent portions.

When the common electrode CE is a plate-shaped electrode, the common electrode CE can be a transparent electrode. When the common electrode CE is a mesh-shaped electrode or a bent electrode, the common electrode CE can be an opaque electrode.

Each of the plurality of common electrodes CE can overlap two or more sub-pixels SP.

For example, the plurality of common lines CL can be disposed in parallel with the plurality of data lines DL.

Referring to FIG. 1 to FIG. 3, the driving circuits can include a data driving circuit DDC to drive the plurality of data lines DL, a gate driving circuit GDC to drive the plurality of gate lines GL, and a display controller DCTR to control the data driving circuit DDC and the gate driving circuit GDC, and can further include a common driving circuit CDC to drive the plurality of common electrodes CE.

The common driving circuit CDC can supply a common signal VCOM to the plurality of common electrodes CE through the plurality of common lines CL.

The display controller DCTR supplies various control signals DCS and GCS to the data driving circuit DDC and the gate driving circuit GDC to control the data driving circuit DDC and the gate driving circuit GDC.

The display controller DCTR starts scanning according to a timing configured in each frame, converts input image data that is externally input according to a data signal format used by the data driving circuit DDC to output converted digital image data DATA, and controls data driving at a proper time in accordance with scanning.

The gate driving circuit GDC sequentially supplies on-voltage or off-voltage gate signals to the plurality of gate lines GL under the control of the display controller DCTR.

When a particular gate line GL is opened by the gate driving circuit GDC, the data driving circuit DDC converts an image data signal, which is received from the display controller DCTR, into an image analog signal and supplies a data signal VDATA corresponding to the image analog signal to the plurality of data lines DL.

The display controller DCTR can be a timing controller used in general display technology or can be a control device that includes a timing controller and further performs other control functions, or can be a control device different from a timing controller.

The display controller DCTR can be configured as a separate component from the data driving circuit DDC or can be configured as an integrated circuit with the data driving circuit DDC.

The data driving circuit DDC supplies a data signal VDATA to the plurality of data lines DL, thereby driving the plurality of data lines DL. Here, the data driving circuit DDC is also referred to as a source driver.

The data driving circuit DDC can include at least one source driver integrated circuit (SDIC). Each SDIC can include a shift register, a latch circuit, a digital-to-analog converter (DAC), and an output buffer circuit. If appropriate, each SDIC can further include an analog-to-digital converter (ADC).

Each SDIC can be connected to a bonding pad of the display panel DISP by a tape-automated-bonding (TAB) method or can be disposed directly on the display panel DISP by a chip-on-glass (COG) method. If appropriate, each SDIC can be integrated with the display panel DISP. In addition, each source driver integrated circuit SDIC can be mounted on a film connected to the display panel DISP by a chip-on-film (COF) method.

The gate driving circuit GDC sequentially supplies a gate signal VGATE (also referred to as a scan voltage, a scan signal, or a gate voltage) to the plurality of gate lines GL, thereby sequentially driving the plurality of gate lines GL. Here, the gate driving circuit GDC is also referred to as a scan driver.

Here, the gate signal VGATE includes an off-level gate voltage for closing a gate line GL and an on-level gate voltage for opening the gate line GL.

Specifically, the gate signal VGATE includes an off-level gate voltage for turning off a transistor connected to a gate line GL and an on-level gate voltage for turning on the transistor connected to the gate line GL.

When a transistor is an N type, an off-level gate voltage can be a low-level gate voltage VGL, and an on-level gate voltage can be a high-level gate voltage VGH. When a transistor is a P type, an off-level gate voltage can be a high-level gate voltage VGH, and an on-level gate voltage can be a low-level gate voltage VGL. Hereinafter, for convenience of explanation, it is assumed that an off-level gate voltage is a low-level gate voltage VGL, and an on-level gate voltage is a high-level gate voltage VGH.

The gate driving circuit GDC can include at least one gate driver integrated circuit (GDIC). Each GDIC can include a shift register and a level shifter.

Each GDIC can be connected to a bonding pad of the display panel DISP by a TAB method, or can be provided in a gate-in-panel (GIP) type to be disposed directly on the display panel DISP by a COG method. If appropriate, each GDIC can be integrated with the display panel DISP. In addition, each GDIC can be mounted on a film connected to the display panel DISP by a COF method.

As illustrated in FIG. 1, the data driving circuit DDC can be disposed at only one side (for example, the upper or lower side) of the display panel DISP. If appropriate, the data driving circuit DDC can also be disposed on both sides (for example, the upper and lower sides) of the display panel DISP depending on the driving method, the panel design, or the like.

As illustrated in FIG. 1, the gate driving circuit GDC can be disposed at only one side (for example, the left or right side) of the display panel DISP. If appropriate, the gate driving circuit GDC can also be disposed on both sides (for example, the left and right sides) of the display panel DISP depending on the driving method, the panel design, or the like.

The touch display device according to embodiments of the disclosure can include various types of display devices, such as a liquid crystal display device and an organic light emitting display device. The display panel DISP according to embodiments of the disclosure can include various types of display panels, such as a liquid crystal display panel and an organic light emitting display panel.

Each sub-pixel SP disposed on the display panel DISP can include one or more circuit elements (for example, a transistor and a capacitor).

For example, when the display panel DISP is a liquid crystal display panel, a pixel electrode PXL can be disposed in each sub-pixel SP, and a transistor TR maybe electrically connected to the pixel electrode PXL and a data line DL. The transistor TR can be turned on by a gate signal VGATE supplied to a gate node through a gate line GL, and can output a data signal VDATA, supplied to a source node (or drain node) through the data line DL, to the drain node (or source node) to apply the data signal VDATA to the pixel electrode PXL electrically connected to the drain node (or source node) when turned on. An electric field is formed between the pixel electrode PXL to which the data signal VDATA is supplied and a common electrode to which a common signal VCOM is applied, and a capacitance can be formed between the pixel electrode PXL and the common electrode.

The structure of each sub-pixel SP can be varied according to the panel type, the provided function, and the design.

The plurality of common electrodes CE mentioned above is not only a display driving electrode, to which a common signal VCOM forming an electric field with a data signal VDATA is applied during display driving, but also a touch electrode for touch sensing. Hereinafter, a common signal VCOM is referred to as a reference common signal.

Therefore, a reference common signal VCOM applied to the common electrodes CE is not only a signal for display driving but also a signal for touch driving.

For example, referring to FIG. 2 and FIG. 3, a reference common signal VCOM serves as a display common voltage for forming capacitance Cst with a data signal VDATA supplied to each of two or more sub-pixels SP overlapping a first common electrode CE1 and for forming capacitance Cst with a data signal VDATA supplied to each of two or more sub-pixels SP overlapping a second common electrode CE2.

Further, the reference common signal VCOM can also serve as a touch driving signal for differentially sensing the first common electrode CE1 and the second common electrode CE2, thus driving the first common electrode CE1 and the second common electrode CE2 in order to detect the presence of a touch or the coordinates of a touch.

Referring to referring to FIG. 2 and FIG. 3, the first common electrode CE1 and the second common electrode CE2 can be disposed in the same column or in the same row.

Two or more data lines DL overlapping the first common electrode CE1 can overlap the second common electrode CE2. Two or more gate lines GL overlapping the first common electrode CE1 do not overlap with the second common electrode CE2.

The plurality of common lines CL can include a first common line CL1 for electrically connecting the first common electrode CE1 and the common driving circuit CDC and a second common line CL2 for electrically connecting the second common electrode CE2 and the common driving circuit CDC. The first common line CL1 can overlap the second common electrode CE2 but can be insulated from the second common line CL2 on the display panel DISP. As necessary or if appropriate, the first common line CL1 and the second common line CL2 can be electrically connected in the common driving circuit CDC.

Referring to FIG. 1 and FIG. 2, in order to provide the touch sensing function, the touch display device according to embodiments of the disclosure can include the plurality of common electrodes CE, the common driving circuit CDC to drive and sense the plurality of common electrodes CE, and a touch controller TCTR to sense a touch using the result of sensing the display panel DISP by the common driving circuit CDC.

The plurality of common electrodes CE corresponds to a touch sensor to sense a touch made by a user when a pointer of the user is in contact with or in proximity to a screen. Here, the pointer of the user can be a finger, a pen, or the like.

The pen can be a passive pen having no signal transceiving function or an active pen having a signal transceiving function. The common driving circuit CDC can supply a touch driving signal to the display panel DISP and can sense the display panel DISP. The touch controller TCTR can sense a touch using the result of sensing the display panel DISP by the common driving circuit CDC. Here, sensing a touch can mean determining the presence of a touch and/or the coordinates of a touch.

The touch controller TCTR can be configured, for example, as a micro-control unit (MCU), a processor, or the like.

The display controller DCTR and the touch controller TCTR can be configured separately or in an integrated manner.

The touch display device according to embodiments of the disclosure can sense a touch on the basis of the self-capacitance of a common electrode CE or can sense a touch on the basis of the mutual capacitance of common electrodes CE.

When the touch display device according to embodiments of the disclosure senses a touch on the basis of a self-capacitance, the common driving circuit CDC can supply a reference common signal VCOM, which is a signal having a variable voltage level, to one or more of the plurality of common electrodes CE, can sense a signal from a common electrode CE, to which the reference common signal VCOM is applied, and can output sensing data, and the touch controller TCTR can calculate the presence of a touch and/or the coordinates of a touch using the sensing data.

When the touch display device according to embodiments of the disclosure senses a touch on the basis of a mutual-capacitance, the common driving circuit CDC can supply a reference common signal VCOM to a common electrode serving as a driving electrode among the plurality of common electrodes CE and can sense a signal from a common electrode serving as a sensing electrode among the plurality of common electrodes CE, and can output sensing data, and the touch controller TCTR can calculate the presence of a touch and/or the coordinates of a touch using the sensing data Hereinafter, for convenience of explanation, it is assumed that the touch display device according to embodiments of the disclosure senses a touch on the basis of a self-capacitance. It is also assumed that the display panel DISP is configured as shown in FIG. 2 and FIG. 3.

A reference common signal VCOM output from the common driving circuit CDC can be a signal having a constant voltage level or a signal having a variable voltage level.

When a reference common signal VCOM is a signal having a variable voltage level, the reference common signal VCOM can have various signal waveforms, for example, a sinusoidal waveform, a triangular waveform, or a rectangular waveform.

The data driving circuit DDC can convert digital image data DATA, which is received from the display controller DCTR through the DAC, into a data signal VDATA in the form of an analog voltage.

In digital-to-analog conversion, the data driving circuit DDC can convert digital image data DATA into a data signal VDATA in the form of an analog voltage on the basis of a plurality of gamma reference voltages GRV.

The plurality of gamma reference voltages GRV is supplied from a gamma circuit GAM. The gamma circuit GAM can exist outside or inside the data driving circuit DDC.

A ground voltage GND can be applied to the display panel DISP. The ground voltage GND can be a DC voltage or an AC voltage having a variable voltage level.

Figure 4:
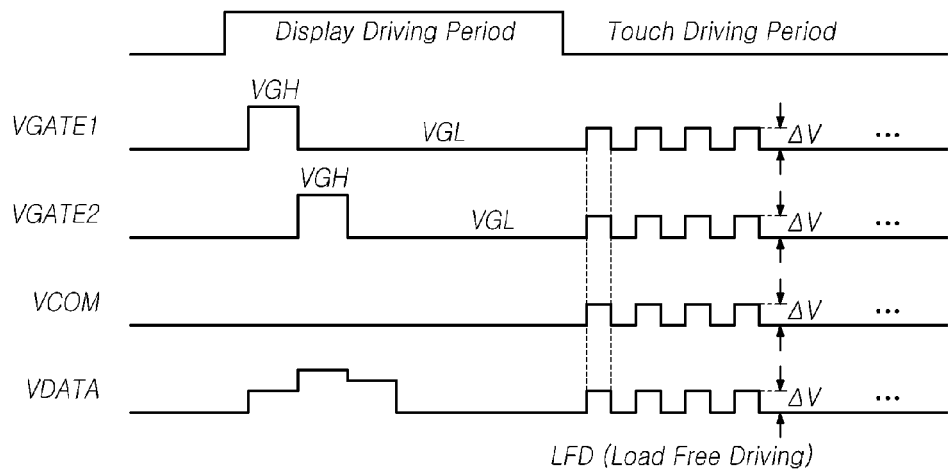
FIG. 4 is a diagram illustrating a time-division driving timing for display driving and touch driving of a touch display device according to embodiments of the disclosure.

FIG. 4 is a diagram illustrating a time-division driving timing for display driving and touch driving of a touch display device according to embodiments of the disclosure.

Referring to FIG. 4, the touch display device according to embodiments of the disclosure can separately perform display driving and touch driving in divided time periods. This driving method is referred to as a time-division driving.

During a display driving period, a reference common signal VCOM in the form of a DC voltage is applied to a plurality of common electrodes CE. Gate signals VGATE1 and VGATE2, which generally have a turn-off-level voltage VGL but have a turn-on level voltage VGH at a scanning timing, can be sequentially applied to a plurality of gate lines GL. A corresponding data signal VDATA can be applied to a plurality of data lines DL.

During a touch driving period after the display driving period, a reference common signal VCOM having a voltage level changing with time can be applied to all or some of the plurality of common electrodes CE.

During the touch driving period, a reference common signal VCOM that is the same as or corresponds to a reference common signal VCOM applied to a common electrode CE to be sensed can be applied to all or some of the plurality of common electrodes CE disposed on a display panel DISP in order to avoid a parasitic capacitance Ccc between the common electrode CE to be sensed and a different common electrode CE not to be sensed.

Further, during the touch driving period, a data signal VDATA that is the same as or corresponds to the reference common signal VCOM applied to the common electrode CE to be sensed can be applied to all or some of the plurality of data lines DL disposed on the display panel DISP in order to avoid a parasitic capacitance Cdc between the common electrode CE and a data line DL.

In addition, during the touch driving period, a gate signal VGATE that is the same as or corresponds to the reference common signal VCOM applied to the common electrode CE to be sensed can be applied to all or some of the plurality of gate lines GL disposed on the display panel DISP in order to avoid a parasitic capacitance Cgc between the common electrode CE and a gate line GL.

Applying the signals that are the same as or correspond to the reference common signal VCOM to a common electrode CE, a data line DL, and a gate line GL which are not to be sensed on the display panel DISP during the touch driving period is referred to as load-free driving (LFD). This LFD can prevent an unnecessary parasitic capacitance (Ccc, Cgc, and Cdc), thus preventing a decrease in touch sensitivity incurred by a parasitic capacitance.

The signals applied to the common electrode CE, the data line DL, and the gate line GL which are not to be sensed on the display panel DISP during the touch driving period can correspond, in frequency and phase, to the reference common signal VCOM applied to the common electrode CE to be sensed.

Further, the signals applied to the common electrode CE, the data line DL, and the gate line GL which are not to be sensed on the display panel DISP during the touch driving period can correspond, in amplitude ΔV, to the reference common signal VCOM applied to the common electrode CE to be sensed.

Figure 5:
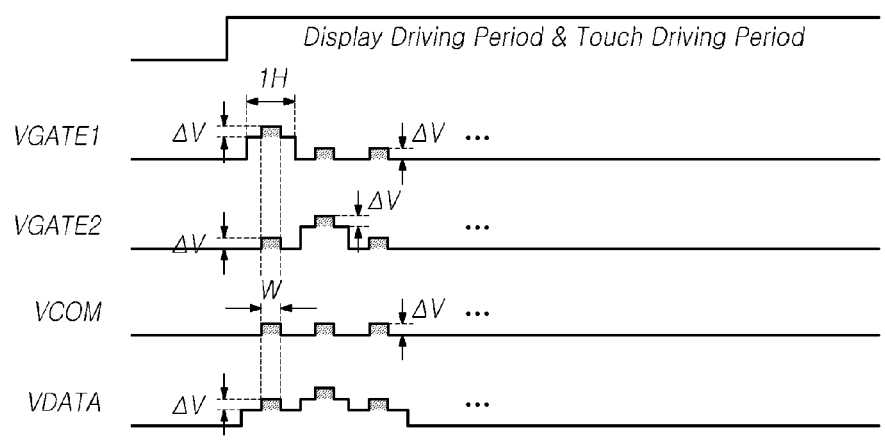
FIG. 5 and FIG. 6 are diagrams illustrating a simultaneous driving timing for display driving and touch driving of a touch display device according to embodiments of the disclosure.
Figure 6:
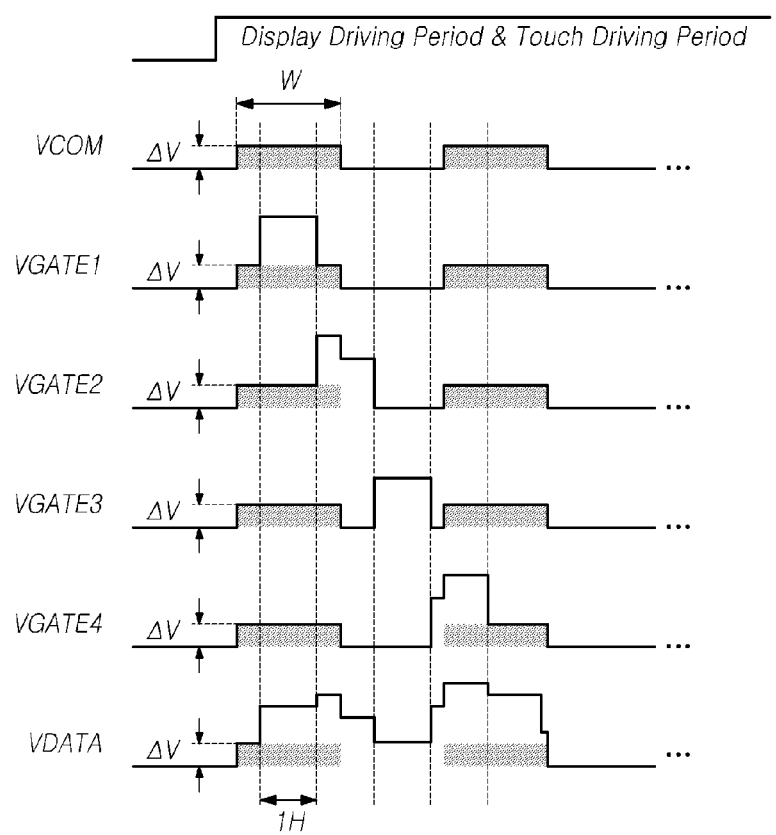

FIG. 5 and FIG. 6 are diagrams illustrating a simultaneous driving timing for display driving and touch driving of a touch display device according to embodiments of the disclosure.

Referring to FIG. 5 and FIG. 6, the touch display device according to embodiments of the disclosure can simultaneously perform display driving and touch driving. This driving method is referred to as simultaneous driving.

Referring to FIG. 5 and FIG. 6, while display driving is performed by supplying a data signal VDATA for displaying an image to a plurality of data lines DL, a common driving circuit CDC can supply a reference common signal VCOM swinging with a predetermined amplitude ΔV to a plurality of common electrodes CE.

Here, the reference common signal VCOM can be a signal having a voltage level swinging (changing). The reference common signal VCOM can also be referred to as a modulation signal, an AC signal, or a pulse signal.

Referring to FIG. 5, the width W of a high-level voltage period of the reference common signal VCOM can be shorter than one horizontal time 1H for display driving.

In this case, the voltage level of the reference common signal VCOM can change once or more during a high-level voltage period of a data signal VDATA for displaying an image supplied to at least one data line DL among the plurality of data lines DL or during a high-level voltage period of a gate signal VGATE supplied to at least one gate line GL among a plurality of gate lines GL.

For example, the data signal VDATA applied to the data line DL has a form of the original signal for displaying an image plus the reference common signal VCOM. Therefore, the data signal VDATA can have a voltage change point equal to the amplitude ΔV of the reference common signal VCOM.

Referring to FIG. 6, the width W of the high-level voltage period of the reference common signal VCOM can be longer than one horizontal time 1H for display driving.

In this case, during the high-level voltage period of the reference common signal VCOM, the voltage level of a data signal VDATA for displaying an image supplied to at least one data line DL among the plurality of data lines DL can change once or more, or the voltage level of a gate signal VGATE supplied to at least one gate line GL among the plurality of gate lines GL can change once or more.

Referring to FIG. 5 and FIG. 6, in simultaneous driving, the data signal VDATA applied to the data line DL has a form of the original signal for displaying an image plus the reference common signal VCOM. Therefore, the data signal VDATA can have a voltage change point equal to the amplitude ΔV of the reference common signal VCOM.

Referring to FIG. 5 and FIG. 6, in simultaneous driving, the gate signal VGATE applied to the gate line GL has a form of the original signal for gate driving plus the reference common signal VCOM. Therefore, the gate signal VGATE can have a voltage change point equal to the amplitude ΔV of the reference common signal VCOM.

As described above, since the data signal VDATA has the voltage change point equal to the amplitude ΔV of the reference common signal VCOM, the data signal VDATA minus the reference common signal VCOM is equal to a data signal VDATA in a display driving period in time-division driving.

Likewise, since the gate signal VGATE has the voltage change point equal to the amplitude ΔV of the reference common signal VCOM, the gate signal VGATE minus the reference common signal VCOM is equal to a gate signal VGATE in a display driving period in time-division driving.

That the data signal VDATA has the voltage change point equal to the amplitude ΔV of the reference common signal VCOM and the gate signal VGATE has the voltage change point equal to the amplitude ΔV of the reference common signal VCOM indicates that the data signal VDATA and the gate signal VGATE are modulated on the basis of the reference common signal VCOM.

As described above, by changing (modulating) the signal waveforms of the data signal VDATA and the gate signal VGATE, display driving cannot be affected by touch driving even though display driving and touch driving are performed at the same time in simultaneous driving.

Changing the signal waveforms of the data signal VDATA and the gate signal VGATE corresponds to a type of LFD driving for improving touch sensitivity by preventing unnecessary parasitic capacitances (Ccc, Cgc, and Cdc).

For example, simultaneous driving can be performed by a gamma modulation scheme or a ground modulation scheme.

According to the gamma modulation scheme, a data driving circuit DDC can perform digital-to-analog conversion using a gamma reference voltage (GRW) corresponding in frequency, phase, and amplitude ΔV to a reference common signal VCOM in digital-to-analog conversion, thereby changing a data signal VDATA.

Further, a turn-off level voltage (VGL) and a turn-on level voltage (VGH) needed to generate a gate signal VGATE can be changed to correspond in frequency, phase, and amplitude ΔV to the reference common signal VCOM, thereby generating the gate signal VGATE.

According to the ground modulation scheme, a ground voltage (GND) applied to a display panel DISP is a signal having a variable voltage level, and is modulated to correspond in frequency and phase to a reference common signal (VCOM), thereby swinging all types of signals applied to the display panel DISP on the basis of the ground voltage (GND).

The touch display device according to embodiments of the disclosure can perform time-division driving at a certain timing while performing simultaneous driving.

Figure 7:
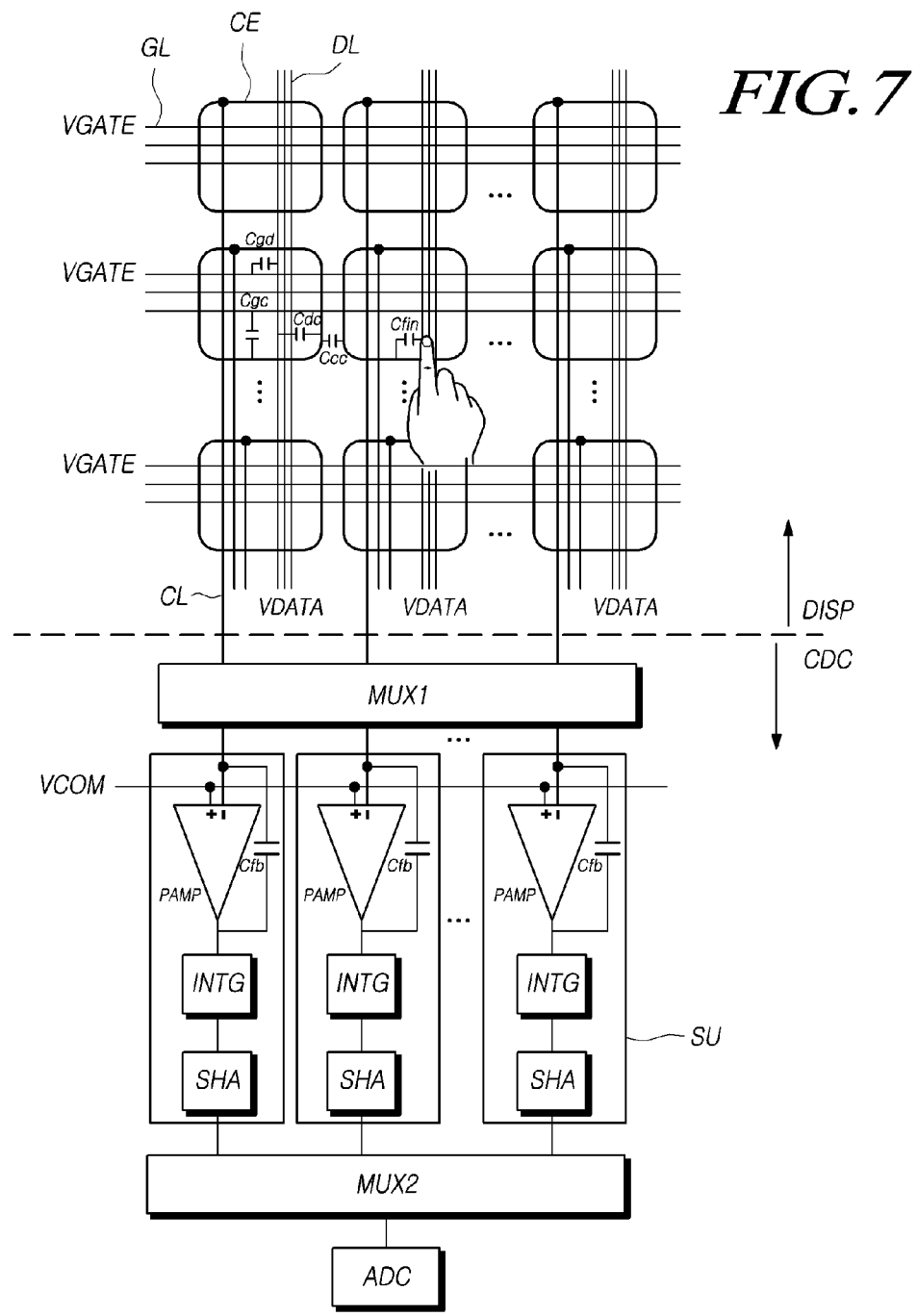
FIG. 7 illustrates a single sensing circuit in a touch display device according to embodiments of the disclosure.

FIG. 7 illustrates a single sensing circuit in a touch display device according to embodiments of the disclosure.

Referring to FIG. 7, a common driving circuit CDC of the touch display device according to embodiments of the disclosure can include a first multiplexer circuit MUX1, a plurality of sensors SU, a second multiplexer circuit MUX2, and an analog-to-digital converter ADC.

The first multiplexer circuit MUX1 selects as many common electrodes CE as the number of the plurality of sensors SU from among a plurality of common electrodes CE as sensing electrodes.

Each of the plurality of sensors SU can include a preamplifier PAMP, an integrator INTG, and a sample and hold circuit SHA.

The preamplifier PAMP can supply a reference common signal VCOM, which is input to a non-inverting input terminal, to a common electrode CE through an inverting input terminal.

Further, the preamplifier PAMP receives a signal in the form of charges from the common electrode CE through the inverting input terminal, charges a feedback capacitor Cfb, and outputs a voltage according to the charge charged in the feedback capacitor Cfb.

The integrator INTG integrates the output voltage from the preamplifier PAMP and outputs an integral value.

The sample and hold circuit SHA can store and output the output integral value from the integrator INTG.

The second multiplexer circuit MUX2 selects one of the plurality of sensors SU and outputs a final output value from the selected sensor SU to the analog-to-digital converter ADC.

The analog-to-digital converter ADC converts an input value into a sensing value corresponding to a digital value.

The common driving circuit CDC provides sensing data including the sensing value converted by the analog-to-digital converter ADC to a touch controller TCTR.

The touch controller TCTR can detect the presence of a touch and/or the coordinates of a touch on the basis of the sensing data.

In time-division driving, during a touch driving period, a parasitic capacitance Cgc between a common electrode CE to be sensed and a gate line GL, a parasitic capacitance Ccc between the common electrode CE to be sensed and a different common electrode CE and a parasitic capacitance Cdc between the common electrode CE to be sensed and a data line DL can be prevented by LFD.

In simultaneous driving, a data signal VDATA and a gate signal VGATE have a voltage change point equal to the amplitude $\Delta V$ of the reference common signal VCOM and thus are equal to those in LFD. Accordingly, a parasitic capacitance Cgc between a common electrode CE to be sensed and a gate line GL, a parasitic capacitance Ccc between the common electrode CE to be sensed and a different common electrode CE and a parasitic capacitance Cdc between the common electrode CE to be sensed and a data line DL can be prevented.

In the common driving circuit CDC illustrated in FIG. 7, each of the plurality of sensors SU senses one common electrode CE at a time, which is referred to as a single sensing method.

According to the foregoing time-division driving, display driving time or touch driving time can be insufficient. In particular, this phenomenon can intensity in a high-resolution large-sized display panel DISP.

On the contrary, simultaneous driving can overcome the disadvantage of time-division driving.

However, when simultaneous driving is performed by the single sensing method, it is necessary to precisely perform signal control because display driving and touch driving need to be performed at the same time. When display driving is performed at a faster speed than that of touch driving (e.g., when one horizontal time 1H for display driving is shorter than the width W of a high-level voltage period of a reference common signal VCOM as in FIG. 6), noise can be increased in touch sensing data.

Accordingly, in order to overcome the disadvantage of simultaneous driving, simultaneous driving can be performed by a differential sensing method of differentially sensing two common electrodes CE at the same time.

Figure 8:
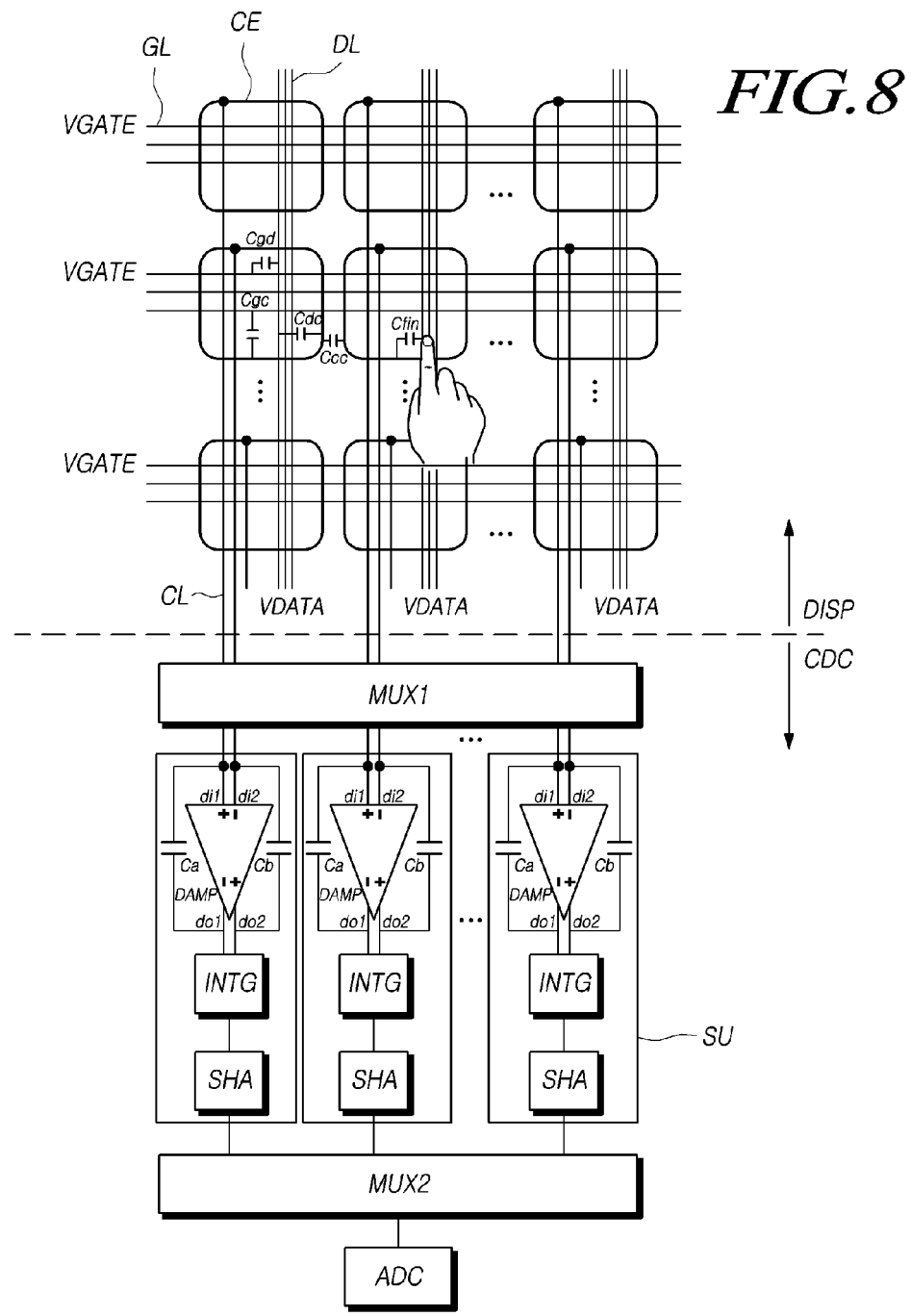
FIG. 8 illustrates a differential sensing circuit in a touch display device according to embodiments of the disclosure.
Figure 9:
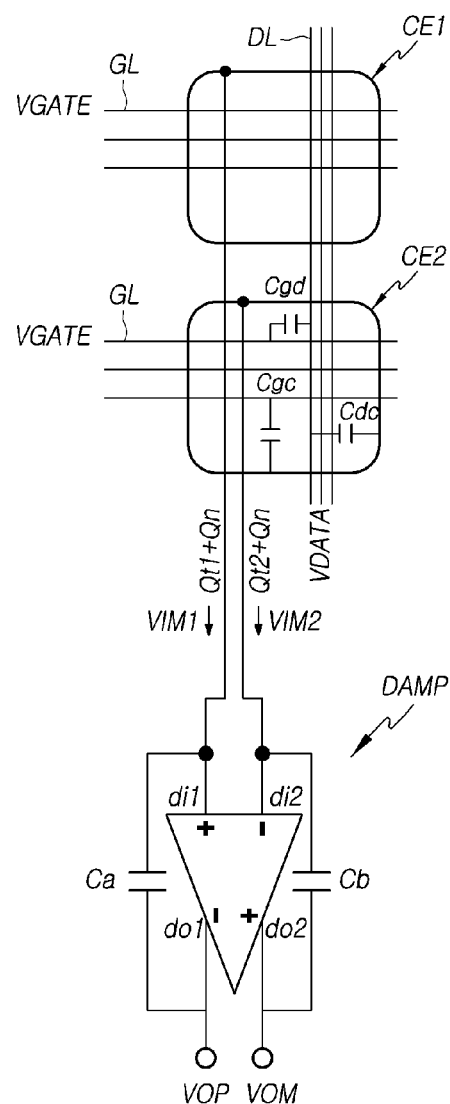
FIG. 9 illustrates a case where noise incurred in a common electrode column is input to a differential amplifier during differential sensing of a touch display device according to embodiments of the disclosure.
Figure 10:
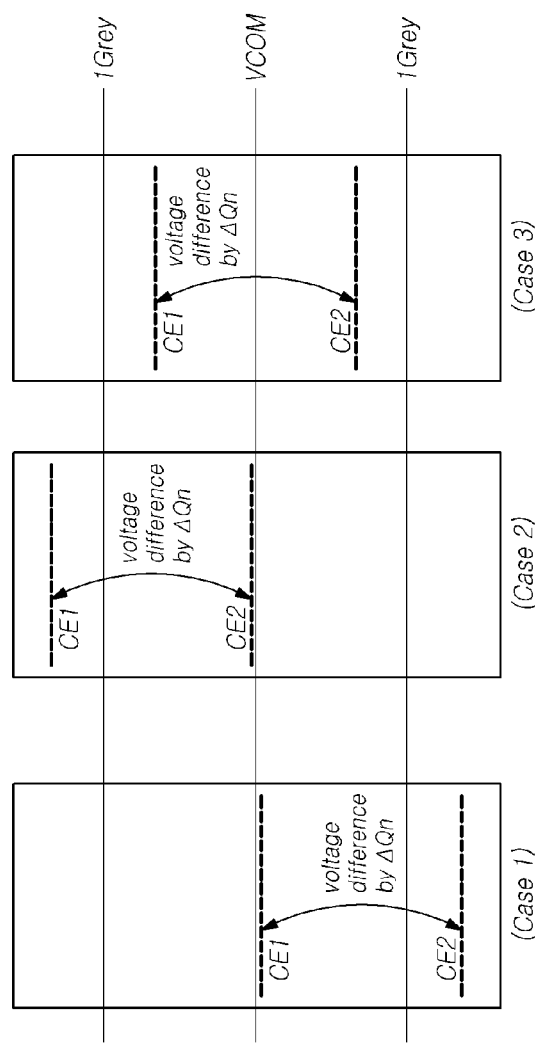
FIG. 10 illustrates an impact of noise incurred in a common electrode column on an image during differential sensing of a touch display device according to embodiments of the disclosure.

FIG. 8 illustrates a differential sensing circuit in a touch display device according to embodiments of the disclosure. FIG. 9 illustrates a case where noise incurred in a common electrode column is input to a differential amplifier DAMP during differential sensing of a touch display device according to embodiments of the disclosure. FIG. 10 illustrates the impact of noise charges Qn incurred in a common electrode column on an image during differential sensing of a touch display device according to embodiments of the disclosure.

Referring to FIG. 8 and FIG. 9, according to the differential sensing method, in a common driving circuit CDC, a first multiplexer circuit MUX1 can select two common electrodes CE to be differentially sensed by each of a plurality of sensors SU.

Each of the plurality of sensors SU differentially senses the two selected common electrodes CE selected by the first multiplexer circuit MUX1.

To this end, each of the plurality of sensors SU can include a differential amplifier (DAMP).

Referring to FIG. 9, the differential amplifier DAMP can receive a first input signal VIM1 and a second input signal VIM2 from a first common electrode CE1 and a second common electrode CE2 through a first input terminal di1 and a second input terminal di2, can differentially amplify the first input signal VIM1 and the second input signal VIM2, and can output a first output signal VOP and a second output signal VOM through a first output terminal do1 and a second output terminal do2.

The differential amplifier DAMP outputs the first output signal VOP and the second output signal VOM having a difference proportional to the difference between the first input signal VIM1 and the second input signal VIM2 by performing differential amplification.

In the differential amplifier DAMP, a first capacitor Ca can be connected to the first input terminal di1 and the first output terminal do1, and a second capacitor Cb can be connected to the second input terminal di2 and the second output terminal do2.

In simultaneous driving, when a data signal VDATA and a gate signal VGATE are modulated on the basis of a reference common signal VCOM, parasitic capacitances Cdc and Cgc generated by a data line DL and a gate line GL with the common electrode can be reduced, thus easily identifying a touch.

However, a display signal itself, such as the data signal VDATA and the gate signal VGATE, is not canceled and thus acts as noise when identifying a touch. Particularly, the data signal VDATA is a value significantly changing depending on the image and thus has characteristics similar to those of random noise. Accordingly, in simultaneous driving, the differential sensing method described above can be advantageous rather than the single sensing method in order to reduce the impact of noise due to the data line DL.

In order to negate the impact of noise due to the voltage fluctuation of the data signal VDATA in the data line DL, as shown in FIG. 9, it is necessary to differentially sense two common electrodes CE1 and CE2 overlapping the same data lines DL.

When the voltage fluctuation of the data signal VDATA occurs during differential sensing of the two common electrodes CE1 and CE2 overlapping the same data lines DL, a change in charge occurs through a parasitic capacitance Cdc between the data lines DL and the two common electrodes CE1 and CE2, which is referred to as a noise charge Qn. For example, a noise charge Qn can occur where there is a difference between a reference common signal VCOM and a data signal VDATA.

Since the data lines DL overlapping the first common electrode CE1 and the data lines DL overlapping the second common electrode CE2 are the same, noise charges Qn occurring at the first input terminal di1 and the second input terminal di2 of the differential amplifier DAMP are the same.

Therefore, the first input signal VIM1 input to the first input terminal di1 of the differential amplifier DAMP is a signal corresponding to charges Qt1+Qn, which is touch charges Qt1 generated in the first common electrode CE1 plus noise charges Qn generated by the data lines DL. The second input signal VIM2 input to the second input terminal di2 of the differential amplifier DAMP is a signal corresponding to charges Qt2+Qn, which is touch charges Qt2 generated in the second common electrode CE2 plus noise charges Qn generated by the data lines DL.

As described above, due to the noise charges Qn, a voltage change occurs at the first input terminal di1 and the second input terminal di2 of the differential amplifier DAMP, and thus an accurate data signal VDATA cannot be charged in sub-pixels SP corresponding to the data lines DL, thus causing deterioration in image quality. Therefore, a separate offset circuit for canceling the noise charges Qn which change every one horizontal time (1H) is required. For the offset circuit, a plurality of aspects illustrated below needs to be considered.

First, the offset circuit needs to continuously operate since it is not sure when the noise charges Qn infiltrates and how many noise charges Qn infiltrates.

Next, the offset circuit needs to be capable of sufficiently driving a heavy load. Since a significantly high parasitic capacitance which is hundreds of pF or higher occurs in a common electrode CE, the offset circuit needs to have a great driving capability in order to increase the voltage holding capability of the common electrode CE.

Further, when there is a slight difference between the quantities of noise charges Qn respectively flowing into the first input terminal di1 and the second input terminal di2 of the differential amplifier DAMP, the offset circuit needs to cancel the average of the quantities of noise charges Qn respectively flowing into the first input terminal di1 and the second input terminal di2 so that the average of the first input signal VIM1 and the second input signal VIM2 is as close to the reference common signal VCOM as possible by differential amplification, thereby preventing image abnormality.

FIG. 10 illustrates the impact of noise charges Qn incurred in a common electrode column on an image during differential sensing of a touch display device according to embodiments of the disclosure.

Referring to FIG. 10, the average of the first input signal VIM1 and the second input signal VIM2 needs to be as close to the reference common signal VCOM as possible.

Case 1 where the first input signal VIM1 is the same as the reference common signal VCOM, case 2 where the second input signal VIM2 is the same as the reference common signal VCOM, and case 3 where the average of the first input signal VIM1 and the second input signal VIM2 is the same as the reference common signal VCOM are considered, and it is assumed that there is a difference in noise charges Qn. In case 1 and case 2, when a gray value of 1 is applied in positive and negative directions, the difference exceeds a gray value of up to 2. In case 3, however, when a gray value of 1 is applied in positive and negative directions, the difference is a gray value of 2 less, thus considerably reducing a screen abnormality.

Hereinafter, a common signal stabilization amplifier VSAMP will be described in detail as an example of the offset circuit.

Figure 11:
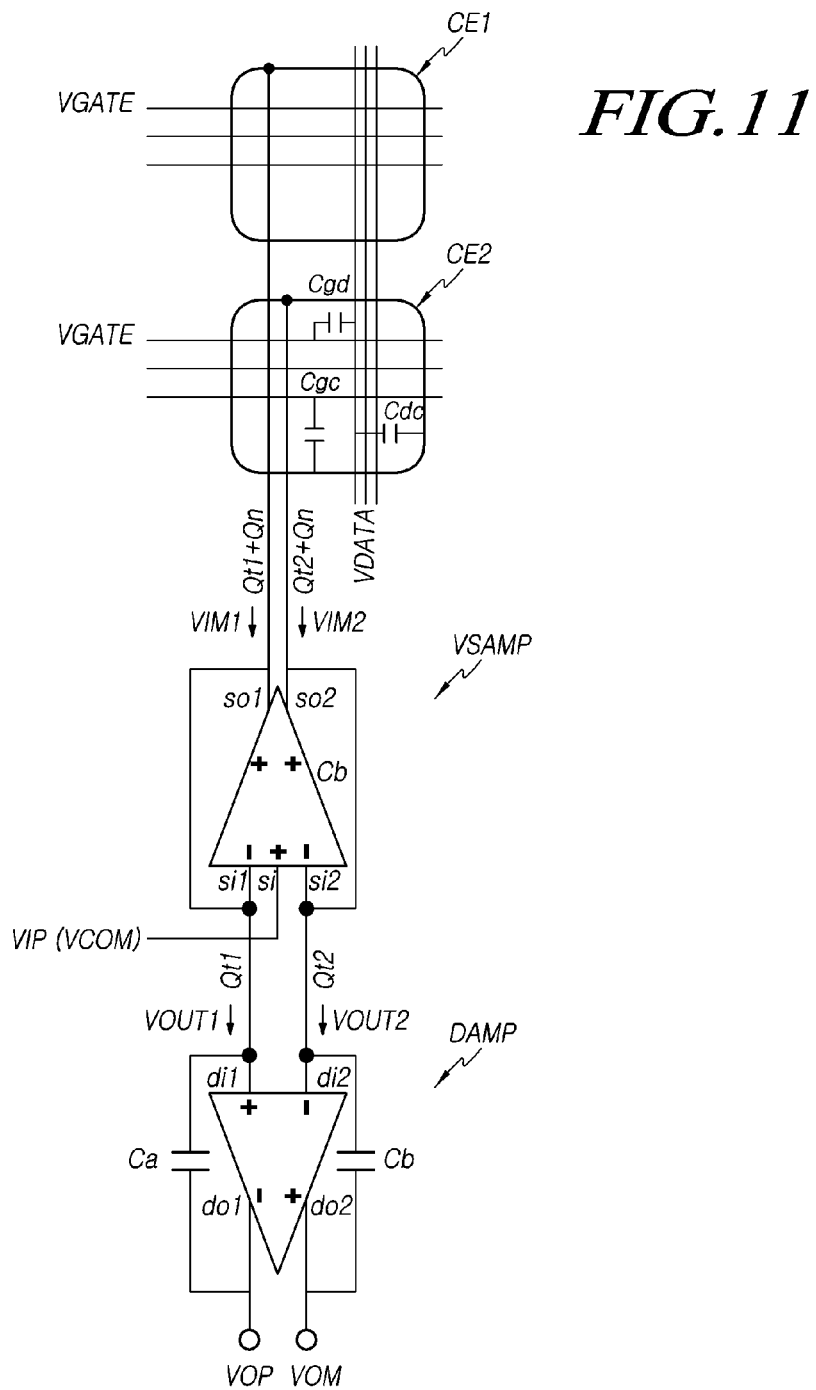
FIG. 11 illustrates a differential sensing circuit including a common signal stabilization amplifier in a touch display device according to embodiments of the disclosure.

FIG. 11 illustrates a differential sensing circuit including a common signal stabilization amplifier VSAMP in a touch display device according to embodiments of the disclosure.

Referring to FIG. 11, in the touch display device according to embodiments of the disclosure, a common driving circuit CDC can differentially amplify a first input signal VIM and a second input signal VIM2 received from a first common electrode CE1 and a second common electrode CE2 among a plurality of common electrodes CE. For example, the common driving circuit CDC can differentially sense the first common electrode CE1 and the second common electrode CE2 among the plurality of common electrodes CE to output differential sensing signals VOP and VOM.

The common driving circuit CDC can include a common signal stabilization amplifier VSAMP and a differential amplifier DAMP.

The differential amplifier DAMP included in the common driving circuit CDC is the same as that illustrated in FIG. 8 and FIG. 9. Therefore, differences from the differential sensing circuit illustrated in FIG. 8 and FIG. 9 will be described below.

The common driving circuit CDC can differentially amplify the first input signal VIM1 and the second input signal VIM2 after removing noise from the first input signal VIM1 and the second input signal VIM2. Here, the removed noise corresponds to the noise charges Qn in FIG. 11.

The common signal stabilization amplifier VSAMP can control the average of the first input signal VIM1 and the second input signal VIM2, which are respectively received from the first common electrode CE1 and the second common electrode CE2, to correspond to a reference common signal VCOM, thereby outputting a first control input signal VOUT1 and a second control input signal VOUT2.

The common signal stabilization amplifier VSAMP can be connected to the first multiplexer circuit MUX1 and the differential amplifier DAMP in the differential sensing circuit of FIG. 8.

The common signal stabilization amplifier VSAMP can include a first input terminal Si1 to which the first input signal VIM1 is input, a second input terminal Si2 to which the second input signal VIM2 is input, a reference input terminal Si to which the reference common signal VCOM is input, a first output terminal So1 from which the first control input signal VOUT1 is output, and a second output terminal So2 from which the second control input signal VOUT2 is output. Here, the reference common signal VCOM is also represented by a VIP hereinafter for convenience of explanation.

The first control input signal VOUT1, which is one of output signals from the common signal stabilization amplifier VSAMP, is a signal in which the noise charges Qn are canceled in the first input signal VIM1. The second control input signal VOUT2, which is another one of the output signals from the common signal stabilization amplifier VSAMP, is a signal in which the noise charges Qn are canceled in the second input signal VIM2.

Thus, the first control input signal VOUT1 can be different from the first input signal VIM1, and the second control input signal VOUT2 can be different from the second input signal VIM2.

However, in the common signal stabilization amplifier VSAMP, the first output terminal So1 is electrically connected to the first input terminal Si1 via a first feedback line FBL1, and the second output terminal So2 can be electrically connected to the second input terminal Si2 via a second feedback line FBL2.

According to this feedback connection structure, as the noise charges Qn or a deviation thereof can be canceled over time, the first input signal VIM1 and the first control input signal VOUT1 can become the same or almost the same, and the second input signal VIM2, and the second control input signal VOUT2 can become the same or almost the same.

The common signal stabilization amplifier VSAMP can supply the reference common signal VIP input through the reference input terminal Si to the first common electrode CE1 and the second common electrode CE2 via the first input terminal Si1 and the second input terminal Si2.

The differential amplifier DAMP can output differential sensing signals VOP and VOM which are proportional to the difference between the first control input signal VOUT1 and the second control input signal VOUT2 output from the common signal stabilization amplifier VSAMP.

For example, when the differential amplifier DAMP is a fully differential amplifier, the differential sensing signals output from the differential amplifier DAMP can include a first output signal VOP and a second output signal VOM having a difference proportional to the difference between the first control input signal VOUT1 and the second control input signal VOUT2.

The differential sensing signals VOP and VOM output from the differential amplifier DAMP can be input to an integrator INTG.

As described above, according to simultaneous driving, the common driving circuit (CDC) can differentially sense the first common electrode CE1 and the second common electrode CE2 for touch sensing during display driving performed by supplying a data signal VDATA for image display to a plurality of data lines DL.

Figure 12:
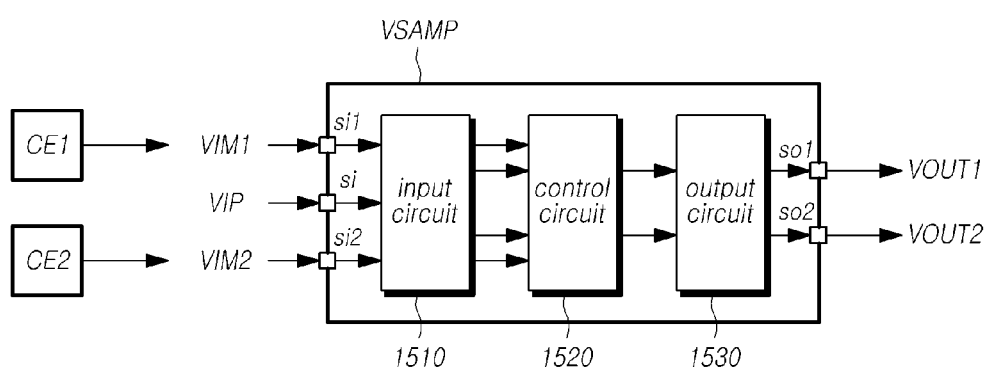
FIG. 12 is a schematic block diagram illustrating a common signal stabilization amplifier according to embodiments of the disclosure.

FIG. 12 is a schematic block diagram illustrating a common signal stabilization amplifier VSAMP according to embodiments of the disclosure.

Referring to FIG. 12, the common signal stabilization amplifier VSAMP can include an input circuit 1510, a control circuit 1520, and an output circuit 1530. Here, the control circuit 1520 is also referred to as a gain circuit.

The input circuit 1510 can compare the average of a first input signal VIM1 and a second input signal VIM2, which are respectively input from a first common electrode CE1 and a second common electrode CE2 through a first input terminal Si1 and a second input terminal Si2, with a reference common signal VIP input through a reference input terminal Si.

The control circuit 1520 can control the first input signal VIM1 and the second input signal VIM2 so that the average of the first input signal VIM1 and the second input signal VIM2 corresponds to the reference common signal VIP.

The output circuit 1530 can output a first control input signal VOUT1 corresponding to the first input signal VIM1 controlled by the control circuit 1520 and a second control input signal VOUT2 corresponding to the second input signal VIM2 controlled by the control circuit 1520 through a first output terminal So1 and a second output terminal So2.

When there is a difference (ΔQn) between the quantities of noise charges Qn respectively input through the first input terminal Si1 and the second input terminal Si2, the input circuit 1510 can cancel (eliminate) the average of the quantities of noise charges Qn respectively input through the first input terminal Si1 and the second input terminal Si2 so that the average of the first input signal VIM1 and the second input signal VIM2 is as close to the reference common signal VIP or VCOM as possible.

The output circuit 1530 can drive a heavy load for a high driving capability.

Further, the output circuit 1530 has a mirroring circuit configuration in order to cancel only noise charges Qn of each of the first and second common electrodes CE1 and CE2, thereby sending or receiving the same current.

Hereinafter, three common signal stabilization amplifiers VSAMP having the control circuit 1520 and the output circuit 1530 of the same configuration but having the input circuit 1510 of different configurations are described.

Figure 13:
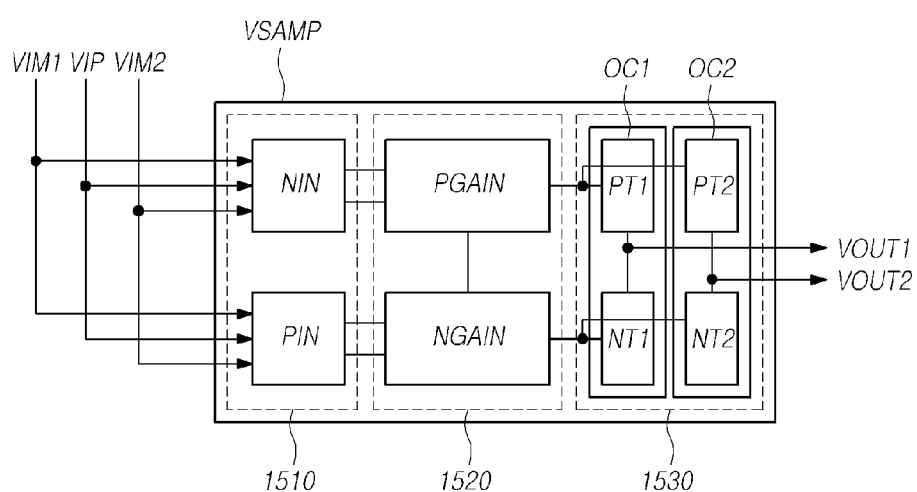
FIG. 13 and FIG. 14 are respectively a block diagram and a detailed circuit diagram illustrating a common signal stabilization amplifier according to embodiments of the disclosure.
Figure 14:
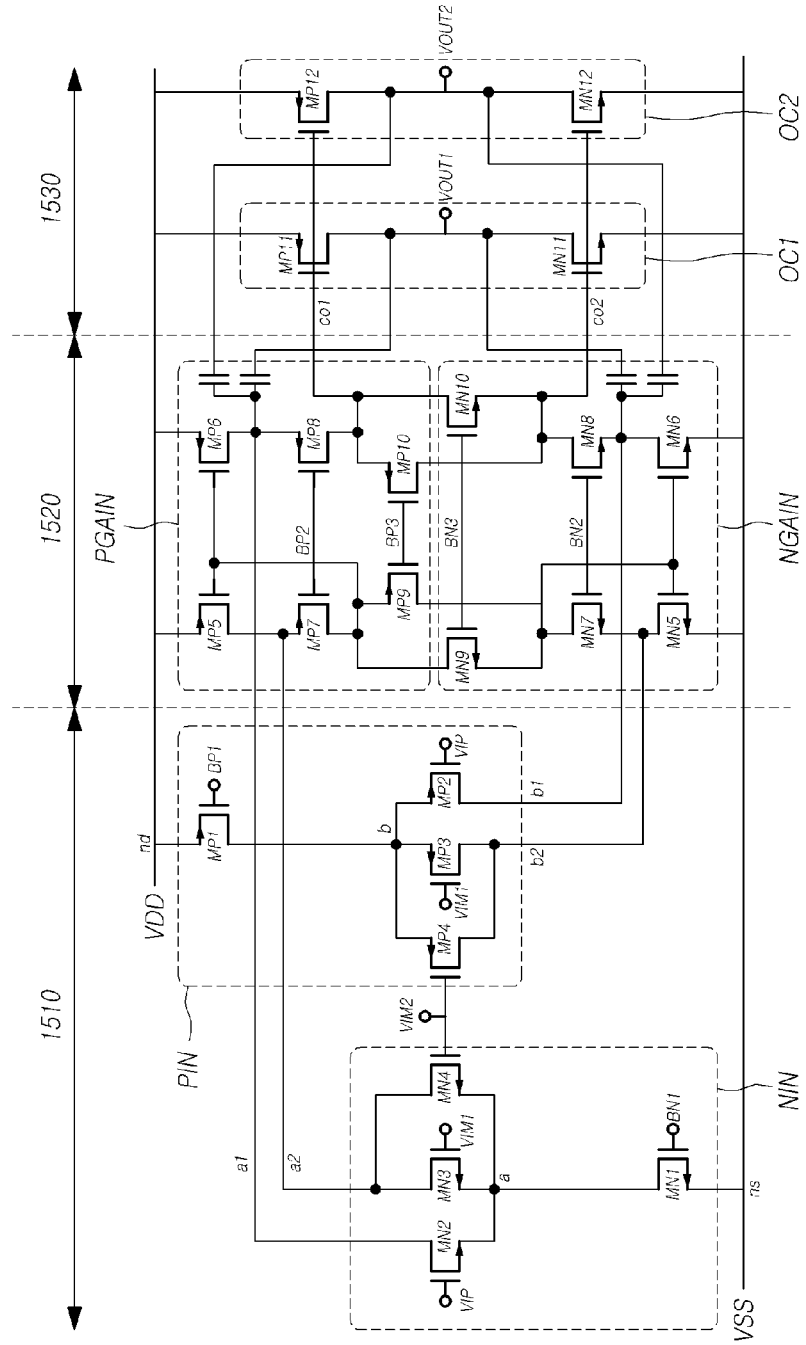

FIG. 13 and FIG. 14 are respectively a block diagram and a detailed circuit diagram illustrating a common signal stabilization amplifier VSAMP according to embodiments of the disclosure.

Referring to FIGS. 13 and 14, an input circuit 1510 can include a first input circuit MIN including a plurality of N-type transistors MN1, MN2, MN3, and MN4 and a second input circuit PIN including a plurality of P-type transistors MP1, MP2, MP3, and MP4.

A control circuit 1520 can include a first control circuit PGAIN including a plurality of P-type transistors MP5, MP6, MP7, MP8, MP9, and MP10 and a second control circuit NGAIN including a plurality of N-type transistors MN5, MN6, MN7, MN8, MN9, and MN10.

An output circuit 1530 can include a first output circuit OC1 including P-type transistors PT1 or MP11 and N-type transistors NT1 or MN11 and a second output circuit OC2 including P-type transistors PT2 or MP12 and N-type transistors NT2 or MN12.

The first input circuit MIN can include first to third N-type transistors MN2, MN3, and MN4 having gate nodes to which a reference common signal VIP, a first input signal VIM1, and a second input signal VIM2 are respectively applied and a fourth N-type transistor MN1 that is turned on or off by a control signal BN1 applied to a gate node and is electrically connected to a point a, to which source nodes of the first to third N-type transistors MN2, MN3, and MN4 are commonly connected, and to a low-potential voltage node ns.

The fourth N-type transistor MN1 controls a reference current to flow.

The second input circuit PIN includes first to third P-type transistors MP2, MP3, and MP4 having gate nodes to which the reference common signal VIP, the first input signal VIM1, and the second input signal VIM2 are respectively applied and a fourth P-type transistor MP1 that is turned on or off by a control signal BP1 applied to a gate node and is electrically connected to a point b, to which source nodes of the first to third P-type transistors MP2, MP3, and MP4 are commonly connected, and to a high-potential voltage node nd.

The fourth P-type transistor MP1 controls a reference current to flow.

The second and third N-type transistors MN3 and MN4 can be connected in parallel.

Accordingly, the first input signal VIM1 and the second input signal VIM2 are input to the gate nodes of the second and third N-type transistors MN3 and MN4, respectively, the source nodes of the second and third N-type transistors MN3 and MN4 are electrically connected, and drain nodes of the second and third N-type transistors MN3 and MN4 are electrically connected.

Output from a drain node a1 of the first N-type transistor MN2 can be input to the first control circuit PGAIN.

Output from the connected drain nodes a2 of the second and third N-type transistors MN3 and MN4 can be input to the first control circuit PGAIN.

The second and third P-type transistors MP3 and MP4 can be connected in parallel.

Accordingly, the first input signal VIM1 and the second input signal VIM2 are input to the gate nodes of the second and third P-type transistors MP3 and MP4, respectively, the source nodes of the second and third P-type transistors MP3 and MP4 are electrically connected, and drain nodes of the second and third P-type transistors MP3 and MP4 are electrically connected.

Output from a drain node b1 of the first P-type transistor MP2 can be input to the second control circuit NGAIN.

Output from the connected drain node sb2 of the second and third P-type transistors MP3 and MP4 can be input to the second control circuit NGAIN.

The control signals BN1 and BP1 used in the input circuit 1510 and control signals BP2, BP3, BN2, and BN3 used in the control circuit 1520 can be turn-on level voltages.

The P-type transistor MP1/ and the N-type transistor MN11 in the first output circuit OC1 are turned on or off respectively by a signal co1 output from the first control circuit PGAIN and a signal co2 output from the second control circuit NGAIN and are connected in series between the high-potential voltage node nd and the low-potential voltage node ns.

A first control input signal VOUT1 is output from a connection node connecting the P-type transistor MP11 and the N-type transistor MN11 in the first output circuit OC1.

The P-type transistor MP12 and the N-type transistor MN12 in the second output circuit OC2 are turned on or off respectively by the signal co1 output from the first control circuit PGAIN and the signal co2 output from the second control circuit NGAIN and are connected in series between the high-potential voltage node nd and the low-potential voltage node ns.

A second control input signal VOUT2 is output from a connection node connecting the P-type transistor MP12 and the N-type transistor MN12 in the second output circuit OC2.

Figure 15:
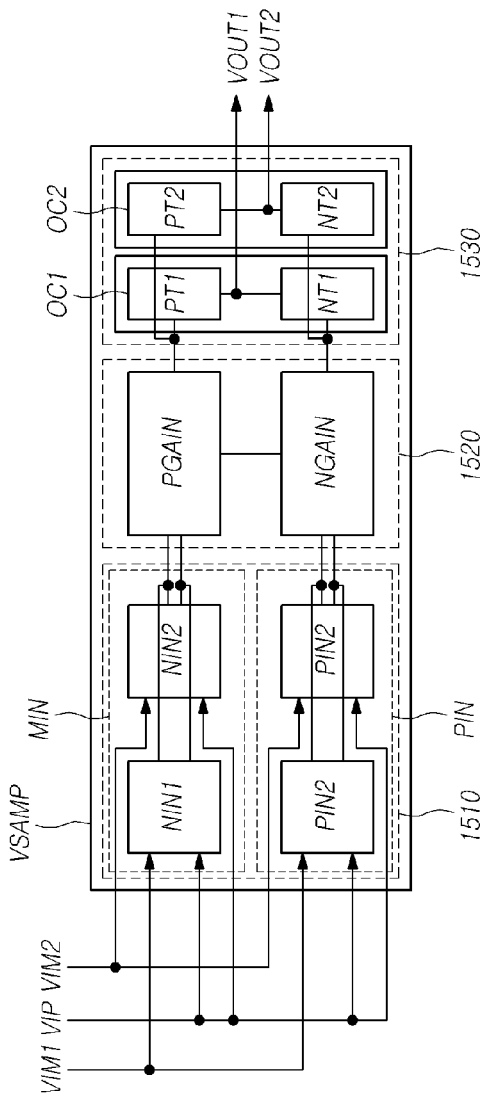
FIG. 15 and FIG. 16 are respectively a block diagram and a detailed circuit diagram illustrating another common signal stabilization amplifier according to embodiments of the disclosure.
Figure 16:
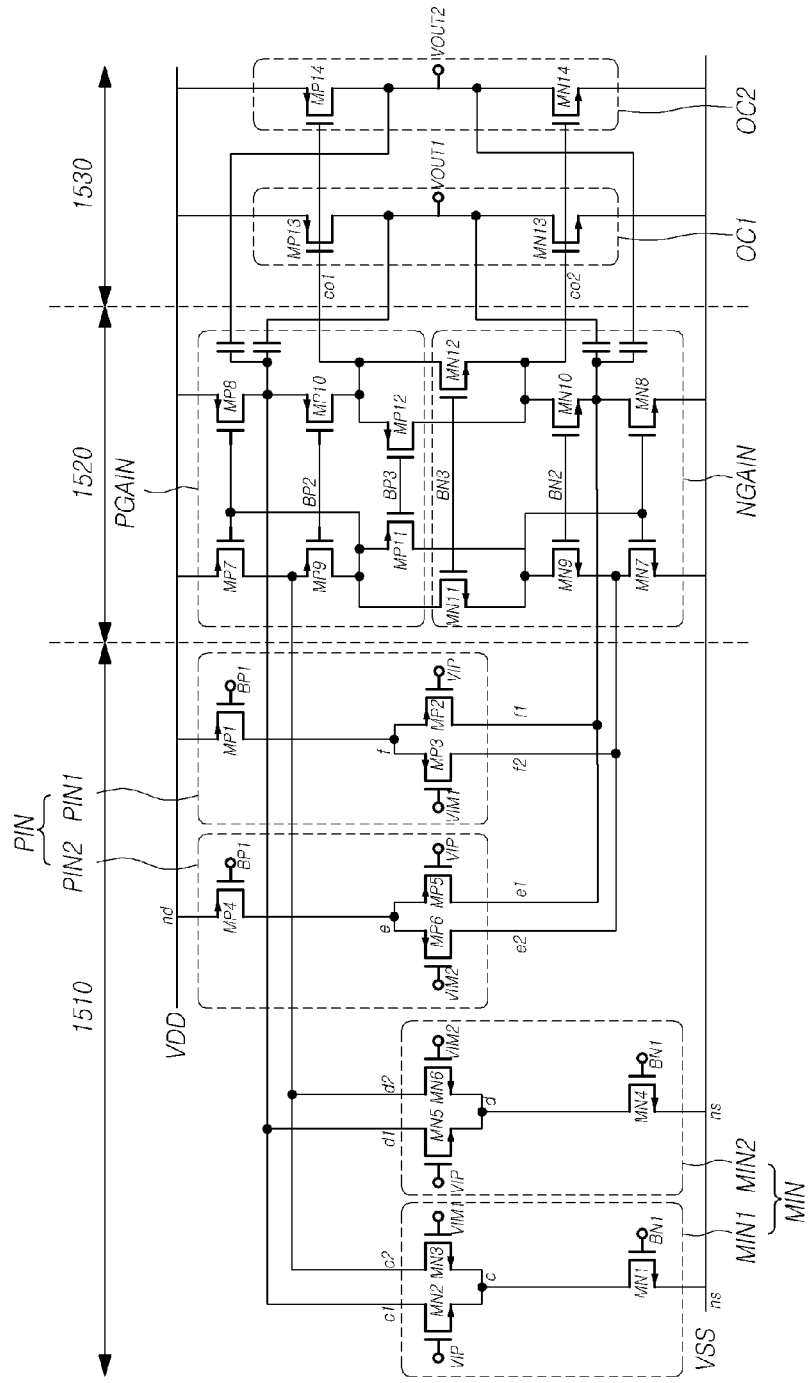

FIG. 15 and FIG. 16 are respectively a block diagram and a detailed circuit diagram illustrating another common signal stabilization amplifier VSAMP according to embodiments of the disclosure.

Referring to FIGS. 15 and 16, an input circuit 1510 can include a first input circuit MIN including a plurality of N-type transistors MN1, MN2, MN3, MN4, MN5, and MN6 and a second input circuit PIN including a plurality of P-type transistors MP1, MP2, MP3, MP4, MP5, and MP6.

A control circuit 1520 can include a first control circuit PGAIN including a plurality of P-type transistors MP7, MP8, MP9, MP10, MP11, and MP12 and a second control circuit NGAIN including a plurality of N-type transistors MN7, MN8, MN9, MN10, MN11, and MN12.

An output circuit 1530 can include a first output circuit OC1 including P-type transistors PT1 or MP13 and N-type transistors NT1 or MN13 and a second output circuit OC2 including P-type transistors PT2 or MP14 and N-type transistors NT2 or MN15.

The first input circuit MIN can include a first part MIN1 and a second part MIN2.

The first part MIN1 of the first input circuit MIN can include first and second N-type transistors MN2 and MN3 having gate nodes to which a reference common signal VIP and a first input signal VIM1 are respectively applied and a third N-type transistor MN1 that is turned on or off by a control signal BN1 and is electrically connected to a point c, to which source nodes of the first and second N-type transistors MN2 and MN3 are commonly connected, and to a low-potential voltage node ns.

The third N-type transistor MN1 controls a reference current to flow.

The second part MIN2 of the first input circuit MIN can include fourth and fifth N-type transistors MN5 and MN6 having gate nodes to which the reference common signal VIP and a second input signal VIM2 are respectively applied and a sixth N-type transistor MN4 that is turned on or off by the control signal BN1 and is electrically connected to a point d, to which source nodes of the fourth and fifth N-type transistors MN5 and MN6 are commonly connected, and to the low-potential voltage node ns.

The sixth N-type transistor MN4 controls a reference current to flow.

The second input circuit PIN can include a first part PIN1 and a second part PIN2.

The first part PIN1 of the second input circuit PIN can include first and second P-type transistors MP2 and MP3 having gate nodes to which the reference common signal VIP and the first input signal VIM1 are respectively applied and a third P-type transistor MP1 that is turned on or off by a control signal BP1 and is electrically connected to a point f, to which source nodes of the first and second P-type transistors MP2 and MP3 are commonly connected, and to a high-potential voltage node nd.

The third P-type transistor MP1 controls a reference current to flow.

The second part PIN2 of the second input circuit PIN can include fourth and fifth P-type transistors MP5 and MP6 having gate nodes to which the reference common signal VIP and the second input signal VIM2 are respectively applied and a sixth P-type transistor MP4 that is turned on or off by the control signal BP1 and is electrically connected to a point e, to which source nodes of the fourth and fifth P-type transistors MP5 and MP6 are commonly connected, and to the high-potential voltage node nd.

The sixth P-type transistor MP4 controls a reference current to flow.

A drain node c1 of the first N-type transistor MN2 and a drain node d1 of the fourth N-type transistor MN5 can be electrically connected to each other, and a drain node c2 of the second N-type transistor MN3 and a drain node d2 of the fifth N-type transistor MN6 can be electrically connected to each other.

A drain node f1 of the first P-type transistor MP2 and a drain node e1 of the fourth P-type transistor MP5 can be electrically connected to each other, and a drain node f2 of the second P-type transistor MP3 and a drain node e2 of the fifth P-type transistor MP6 can be electrically connected to each other.

The control signals BN1 and BP1 used in the input circuit 1510 and control signals BP2, BP3, BN2, and BN3 used in the control circuit 1520 can be turn-on level voltages.

The P-type transistor MP13 and the N-type transistor MN13 in the first output circuit OC1 are turned on or off respectively by a signal co1 output from the first control circuit PGAIN and a signal co2 output from the second control circuit NGAIN and are connected in series between the high-potential voltage node nd and the low-potential voltage node ns.

A first control input signal VOUT1 is output from a connection node connecting the P-type transistor MP13 and the N-type transistor MN13 in the first output circuit OC1.

The P-type transistor MP14 and the N-type transistor MN14 in the second output circuit OC2 are turned on or off respectively by the signal co1 output from the first control circuit PGAIN and the signal co2 output from the second control circuit NGAIN and are connected in series between the high-potential voltage node nd and the low-potential voltage node ns.

A second control input signal VOUT2 is output from a connection node connecting the P-type transistor MP14 and the N-type transistor MN14 in the second output circuit OC2.

Figure 17:
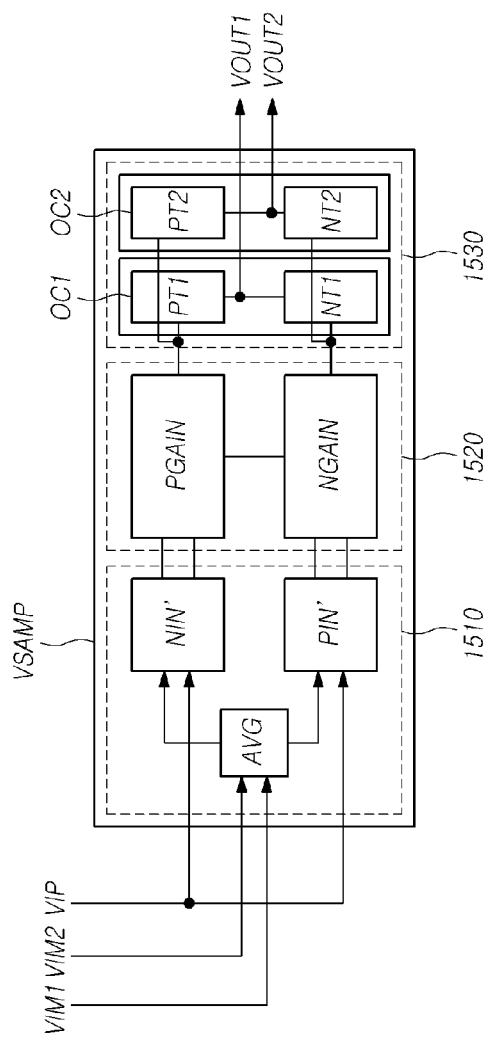
FIG. 17 and FIG. 18 are respectively a block diagram and a detailed circuit diagram illustrating still another common signal stabilization amplifier according to embodiments of the disclosure.
Figure 18:
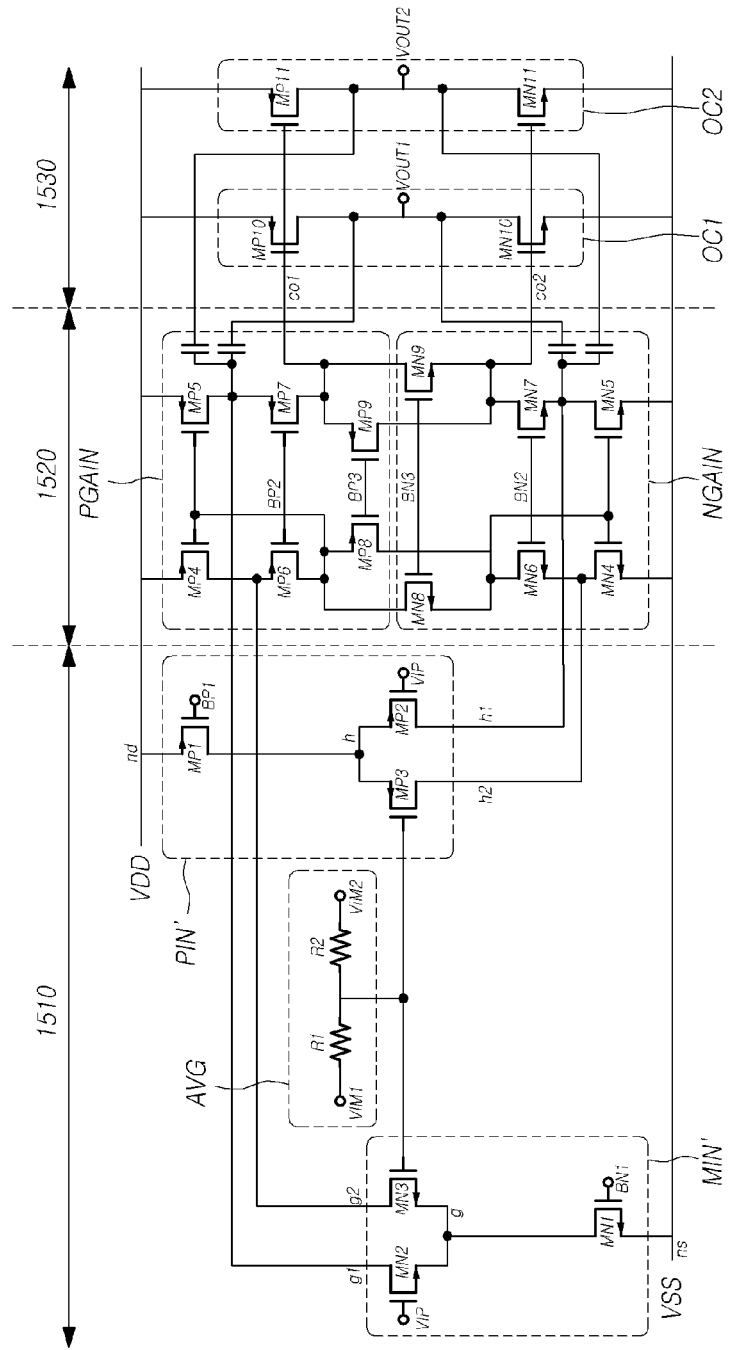

FIG. 17 and FIG. 18 are a block diagram and a detailed circuit diagram illustrating still another common signal stabilization amplifier VSAMP according to embodiments of the disclosure.

An input circuit 1510 can include an average circuit AVG that receives a first input signal VIM1 and a second input signal VIM2 and outputs the average thereof, a first input circuit MIN' including a plurality of N-type transistors MN1, MN2, and MN3, and a second input circuit PIN' including a plurality of P-type transistors MP1, MP2, and MP3.

A control circuit 1520 can include a first control circuit PGAIN including a plurality of P-type transistors MP4, MP5, MP6, MP7, MP8, and MP9 and a second control circuit NGAIN including a plurality of N-type transistors MN4, MN5, MN6, MN7, MN8, and MN9.

An output circuit 1530 can include a first output circuit OC1 including P-type transistors PT1 or MP10 and N-type transistors NT1 or MN10 and a second output circuit OC2 including P-type transistors PT2 or MP11 and N-type transistors NT2 or MN11.

The average circuit AVG can be, for example, a voltage divider circuit including a first resistor R1 and a second resistor R2 which are connected to each other.

The first input signal VIM1 and the second input signal VIM2 are applied to the first resistor R1 and the second resistor R2, and the average of the first input signal VIM1 and the second input signal VIM2 is output from a connection point of the first resistor R1 and the second resistor R2.

In order to output the average of the first input signal VIM1 and the second input signal VIM2, the first resistor R1 and the second resistor R2 can have the same resistance value.

When the resistance values of the first resistor R1 and the second resistor R2 are small, a node to which the first input signal VIM 1 is applied and a node to which the second input signal VIM 2 is applied are short-circuited, and thus touch charges Qt are sensed in a distributed manner. When the resistance values of the first resistor R1 and the second resistor R2 are too large, an RC delay (load) can be increased to reduce the processing speed of the common signal stabi-lization amplifier VSAMP, thus increasing the time to sta-bilize a reference common signal VCOM. Therefore, the first resistor R1 and the second resistor R2 need to be designed to have appropriate resistance values, which are neither too small nor too large.

The first input circuit MIN' can include first and second N-type transistors MN2 and MN3 having gate nodes to which a reference common signal VIP and the average are respectively applied and a third N-type transistor MN1 that is turned on or off by a control signal BN1 and is electrically connected to a point g, to which source nodes of the first and second N-type transistors MN2 and MN3 are commonly connected, and to a low-potential voltage node ns.

Outputs from a drain node g1 of the first N-type transistor MN2 and a drain node g2 of the second N-type transistor MN3 are input to the first control circuit PGAIN.

The second input circuit PIN' can include first and second P-type transistors MP2 and MP3 having gate nodes to which the reference common signal VIP and the average are respectively applied and a third P-type transistor MP1 that is turned on or off by a control signal BP1 and is electrically connected to a point h, to which source nodes of the first and second P-type transistors MP2 and MP3 are commonly connected, and to a high-potential voltage node nd.

Outputs from a drain node h1 of the first P-type transistor MP2 and a drain node h2 of the second P-type transistor MP3 are input to the second control circuit NGAIN.

The control signals BN1 and BP1 used in the input circuit 1510 and control signals BP2, BP3, BN2, and BN3 used in the control circuit 1520 can be turn-on level voltages.

The P-type transistor MP10 and the N-type transistor MN10 in the first output circuit OC1 are turned on or off respectively by a signal co1 output from the first control circuit PGAIN and a signal co2 output from the second control circuit NGAIN and are connected in series between the high-potential voltage node nd and the low-potential voltage node ns.

A first control input signal VOUT1 is output from a connection node connecting the P-type transistor MP10 and the N-type transistor MN10 in the first output circuit OC1.

The P-type transistor MP11 and the N-type transistor MN11 in the second output circuit OC2 are turned on or off respectively by the signal co1 output from the first control circuit PGAIN and the signal co2 output from the second control circuit NGAIN and are connected in series between the high-potential voltage node nd and the low-potential voltage node ns.

A second control input signal VOUT2 is output from a connection node connecting the P-type transistor MP11 and the N-type transistor MN11 in the second output circuit OC2.

Figure 19:
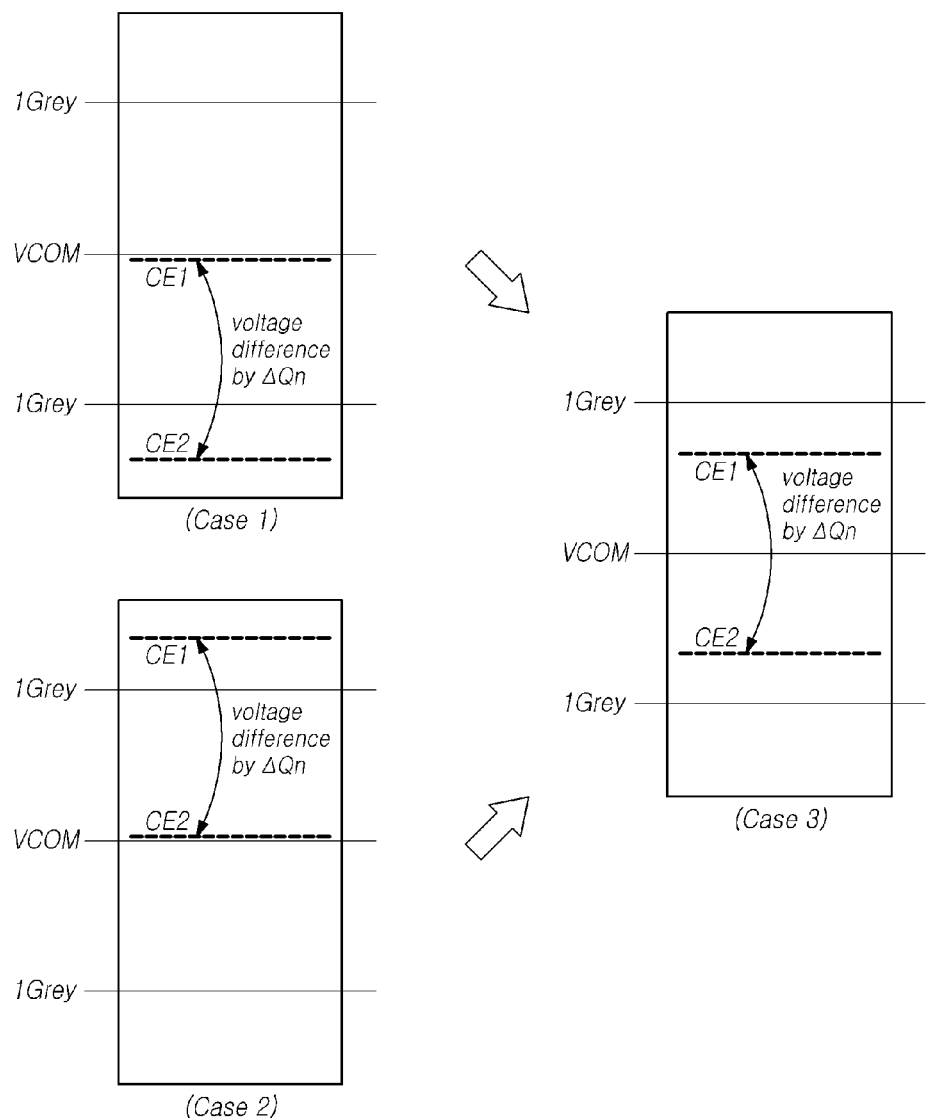
FIG. 19 illustrates the effect of improving image quality by a common signal stabilization amplifier according to embodiments of the disclosure.

FIG. 19 illustrates the effect of improving image quality by a common signal stabilization amplifier VSAMP accord-ing to embodiments of the disclosure.

Referring to FIG. 19, when the common signal stabiliza-tion amplifier VSAMP described above is used, case 1 where a first input signal VIM1 is the same as a reference common signal VCOM and case 2 where a second input signal VIM2 is the same as the reference common signal VCOM can be changed to case 3 where the average of the first input signal VIM1 and the second input signal VIM2 is the same as the reference common signal VCOM.

Therefore, the average of the first input signal VIM1 and the second input signal VIM2 can be as close to the reference common signal VCOM as possible.

For example, when an abnormality, for example, an abnormal peak, occurs in the reference common signal VCOM occurs due to noise charges Qn, the common signal stabilization amplifier VSAMP can cancel the noise charges Qn to thereby normalize the reference common signal VCOM without causing any impact on touch driving and sensing. Accordingly, in simultaneous driving according to the differential sensing method, an image abnormality phenomenon can be prevented.

A simultaneous driving method using the above-described common signal stabilization amplifier VSAMP will be briefly described again.

Figure 20:
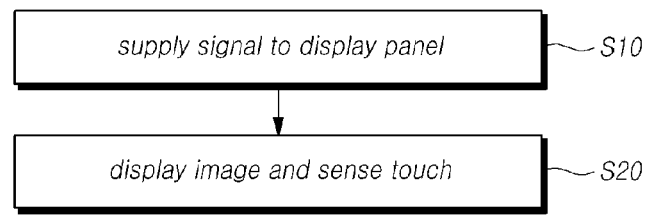
FIG. 20 is a flowchart illustrating a method of driving a touch display device according to embodiments of the disclosure.

FIG. 20 is a flowchart illustrating a method of driving a touch display device according to embodiments of the disclosure. This method can be applied to the touch display device(s) discussed above or other suitable touch display devices.

Referring to FIG. 20, the method of driving the touch display device according to embodiments of the disclosure can include an operation (S10) of outputting a data signal VDATA and a gate signal VGATE to a data line DL and a gate line GL disposed on a display panel DISP and outputting a reference common signal VIP or VCOM to two or more of a plurality of common electrodes CE disposed on the display panel DISP; and an operation (S20) of displaying an image in response to the data signal VDATA and the reference common signal VIP and sensing a touch by differential sensing after removing noise from a first input signal VIM1 and a second input signal VIM2 received from the two or more common electrodes CE, to which the reference common signal VCOM is applied.

According to embodiments of the disclosure, it is possible to provide a touch display device, a common driving circuit CDC, and a driving method that enable display driving and touch driving to be simultaneously performed.

Further, according to embodiments of the disclosure, it is possible to provide a touch display device, a common driving circuit CDC, and a driving method that can reduce the impact of display driving and touch driving on each other when simultaneously performing display driving and touch driving.

In addition, according to embodiments of the disclosure, it is possible to provide a touch display device, a common driving circuit CDC, and a driving method that can prevent an unstable phenomenon that a signal necessary for both display driving and touch driving swings when simultaneously performing display driving and touch driving, thereby improving image quality even though simultaneously performing display driving and touch driving.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A touch display device comprising:
   a display panel on which a plurality of data lines and a plurality of gate lines are disposed and on which a plurality of common electrodes is disposed;
   a data driving circuit configured to drive the plurality of data lines;
   a gate driving circuit configured to drive the plurality of gate lines; and
   a common driving circuit configured to differentially sense a first common electrode and a second common electrode among the plurality of common electrodes, and to output a differential sensing signal,
   wherein the common driving circuit comprises:
      a common signal stabilization amplifier configured to control an average of a first input signal and a second input signal, which are respectively received from the first common electrode and the second common electrode, to correspond to a reference common signal, and to output a first control input signal and a second control input signal; and
      a differential amplifier configured to output the differential sensing signal that is proportional to a difference between the first control input signal and the second control input signal.

2. The touch display device of claim 1, wherein the first control input signal is different from the first input signal, and the second control input signal is different from the second input signal.

3. The touch display device of claim 1, wherein the first control input signal is a signal in which noise charges are canceled in the first input signal, and the second control input signal is a signal in which the noise charges are canceled in the second input signal.

4. The touch display device of claim 1, wherein the common signal stabilization amplifier comprises:
   an input circuit configured to compare the average of the first input signal and the second input signal, which are input from the first common electrode and the second common electrode through a first input terminal and a second input terminal, with the reference common signal input through a reference input terminal;
   a control circuit configured to control the first input signal and the second input signal so that the average of the first input signal and the second input signal corresponds to the reference common signal; and
   an output circuit configured to output the first control input signal corresponding to the first input signal controlled by the control circuit and the second control input signal corresponding to the second input signal controlled by the control circuit through a first output terminal and a second output terminal,
   the first output terminal is electrically connected to the first input terminal through a first feedback line, and
   the second output terminal is electrically connected to the second input terminal through a second feedback line.

5. The touch display device of claim 4, wherein the input circuit comprises a first input circuit comprising N-type transistors and a second input circuit comprising P-type transistors,
   the control circuit comprises a first control circuit comprising P-type transistors and a second control circuit comprising N-type transistors, and
   the output circuit comprises a first output circuit comprising a P-type transistor and an N-type transistor and a second output circuit comprising a P-type transistor and an N-type transistor.

6. The touch display device of claim 5, wherein the first input circuit comprises first to third N-type transistors having gate nodes to which the reference common signal, the first input signal, and the second input signal are respectively applied, and a fourth N-type transistor that is electrically connected to a point, to which source nodes of the first to third N-type transistors are commonly connected, and to a low-potential voltage node, the second input circuit comprises first to third P-type transistors having gate nodes to which the reference common signal, the first input signal, and the second input signal are respectively applied, and a fourth P-type transistor that is electrically connected to a point, to which source nodes of the first to third P-type transistors are commonly connected, and to a high-potential voltage node, the second and third N-type transistors are connected in parallel, and the second and third P-type transistors are connected in parallel.

7. The touch display device of claim 5, wherein the first input circuit comprises:

first and second N-type transistors having gate nodes to which the reference common signal and the first input signal are respectively applied;

a third N-type transistor that is electrically connected to a point, to which source nodes of the first and second N-type transistors are commonly connected, and to a low-potential voltage node;

fourth and fifth N-type transistors having gate nodes to which the reference common signal and the second input signal are respectively applied; and a sixth N-type transistor that is electrically connected to a point, to which source nodes of the fourth and fifth N-type transistors are commonly connected, and to the low-potential voltage node, or wherein the second input circuit comprises:

first and second P-type transistors having gate nodes to which the reference common signal and the first input signal are respectively applied;

a third P-type transistor that is electrically connected to a point, to which source nodes of the first and second P-type transistors are commonly connected, and to a high-potential voltage node;

fourth and fifth P-type transistors having gate nodes to which the reference common signal and the second input signal are respectively applied; and a sixth P-type transistor that is electrically connected to a point, to which source nodes of the fourth and fifth P-type transistors are commonly connected, and to the high-potential voltage node, and wherein:

drain nodes of the first and fourth N-type transistors are electrically connect to each other, drain nodes of the second and fifth N-type transistors are electrically connected to each other, drain nodes of the first and fourth P-type transistors are electrically connected to each other, and drain nodes of the second and fifth P-type transistors are electrically connected to each other.

8. The touch display device of claim 5, wherein the P-type transistor and the N-type transistor in the first output circuit are turned on or off respectively by a signal output from the first control circuit and a signal output from the second control circuit and are connected in series between a high-potential voltage node and a low-potential voltage node, the first control input signal is output from a connection node connecting the P-type transistor and the N-type transistor in the first output circuit, the P-type transistor and the N-type transistor in the second output circuit are turned on or off respectively by the signal output from the first control circuit and the signal output from the second control circuit and are connected in series between the high-potential voltage node and the low-potential voltage node, and the second control input signal is output from a connection node connecting the P-type transistor and the N-type transistor in the second output circuit.

9. The touch display device of claim 4, wherein the input circuit comprises an average circuit configured to receive the first input signal and the second input signal and to output the average thereof, a first input circuit comprising N-type transistors, and a second input circuit comprising P-type transistors, the control circuit comprises a first control circuit comprising P-type transistors and a second control circuit comprising N-type transistors, and the output circuit comprises a first output circuit comprising a P-type transistor and an N-type transistor and a second output circuit comprises a P-type transistor and an N-type transistor.

10. The touch display device of claim 9, wherein the first input circuit comprises first and second N-type transistors having gate nodes to which the reference common signal and the average are respectively applied, and a third N-type transistor that is electrically connected to a point, to which source nodes of the first and second N-type transistors are commonly connected, and to a low-potential voltage node, and the second input circuit comprises first and second P-type transistors having gate nodes to which the reference common signal and the average are respectively applied, and a third P-type transistor that is electrically connected to a point, to which source nodes of the first and second P-type transistors are commonly connected, and to a high-potential voltage node.

11. The touch display device of claim 4, wherein the common signal stabilization amplifier supplies the reference common signal, which is input through the reference input terminal, to the first common electrode and the second common electrode through the first input terminal and the second input terminal.

12. The touch display device of claim 1, wherein the differential sensing signal comprises a first output signal and a second output signal having a difference proportional to the difference between the first control input signal and the second control input signal.

13. The touch display device of claim 1, wherein the plurality of common electrodes is arranged in a matrix form, each of the plurality of common electrodes overlaps two or more sub-pixels, the first common electrode and the second common electrode are disposed in the same column or the same row, two or more data lines overlapping the first common electrode overlap the second common electrode, and two or more gate lines overlapping the first common electrode do not overlap the second common electrode.

14. The touch display device of claim 1, wherein a plurality of common lines electrically connecting the plurality of common electrodes and the common driving circuit is disposed on the display panel, and the plurality of common lines is disposed in parallel with the plurality of data lines.

15. The touch display device of claim 1, wherein the common driving circuit differentially senses the first common electrode and the second common electrode while display driving is performed by supplying a data signal for image display to the plurality of data lines.

16. The touch display device of claim 1, wherein the reference common signal is a signal having a variable voltage level, and
a width of a high-level voltage period of the reference common signal is longer than one horizontal time for display driving.

17. The touch display device of claim 1, wherein the reference common signal is a signal having a variable voltage level, and
a width of a high-level voltage period of the reference common signal is shorter than one horizontal time for display driving.

18. The touch display device of claim 1, wherein the data driving circuit converts digital image data into an analog image signal based on a gamma reference voltage, and
the gamma reference voltage corresponds in frequency and phase to the reference common signal.

19. The touch display device of claim 1, wherein a ground voltage applied to the display panel is a signal having a variable voltage level and corresponds in frequency and phase to the reference common signal.

20. A touch display device comprising:
a display panel on which a plurality of data lines and a plurality of gate lines are disposed and on which a plurality of common electrodes is disposed;
a data driving circuit configured to drive the plurality of data lines;
a gate driving circuit configured to drive the plurality of gate lines; and
a common driving circuit configured to obtain a first control input signal and a second control input signal by controlling an average of a first input signal and a second input signal received from a first common electrode and a second common electrode among the plurality of common electrodes to correspond to a reference common signal, and
differentially amplify the first control input signal and the second control input signal.

21. A common driving circuit comprising:
a common signal stabilization amplifier configured to control an average of a first input signal and a second input signal, which are respectively received from a first common electrode and a second common electrode among a plurality of common electrodes disposed on a display panel, to correspond to a reference common signal and to output a first control input signal and a second control input signal; and
a differential amplifier configured to output a differential sensing signal that is proportional to a difference between the first control input signal and the second control input signal.

22. A method of driving a touch display device including a display panel, the method comprising:
outputting a data signal and a gate signal to a data line and a gate line disposed on the display panel, and outputting a reference common signal to two or more of a plurality of common electrodes disposed on the display panel; and
displaying an image in response to the data signal and the reference common signal, and after obtaining a first control input signal and a second control input signal by controlling an average of a first input signal and a second input signal received from the two or more common electrodes, to which the reference common signal is applied, to correspond to the reference common signal, sensing a touch by differential amplifying the first control input signal and the second control input signal.

* * * * *